(12) United States Patent  
Morikawa

(10) Patent No.: US 8,373,900 B2
(45) Date of Patent: Feb. 12, 2013

(54) IMAGE READING APPARATUS AND METHOD FOR ADJUSTING SAME

(75) Inventor: Daisuke Morikawa, Abiko (JP)

(73) Assignee: Canon Kabushiki Kaisha (JP)

( * ) Notice: Subject to any disclaimer, the term of this patent is extended or adjusted under 35 U.S.C. 154(b) by 506 days.

(21) Appl. No.: 11/870,183

(22) Filed: Oct. 10, 2007

(65) Prior Publication Data

US 2008/0088887 A1    Apr. 17, 2008

(30) Foreign Application Priority Data

Oct. 11, 2006   (JP) .................................. 2006-277799

(51) Int. Cl.
*G06K 15/00*   (2006.01)

(52) U.S. Cl. ......... 358/2.1; 358/1.8; 358/3.27; 358/401; 358/406; 358/504; 382/274; 382/254; 382/167

(58) Field of Classification Search .................... 358/2.1, 358/1.8, 3.27, 401, 406, 504; 382/274, 254, 382/167
See application file for complete search history.

(56) References Cited

U.S. PATENT DOCUMENTS

| 5,414,536 A * | 5/1995 | Kobayashi ..................... 358/504 |
| 5,995,248 A * | 11/1999 | Katori et al. .................... 358/2.1 |
| 6,597,473 B1 * | 7/2003 | Rasmussen et al. ........... 358/1.9 |
| 6,625,329 B1 * | 9/2003 | Donner et al. ................. 382/277 |
| 2005/0087920 A1 * | 4/2005 | Takamatsu ................. 271/10.01 |

FOREIGN PATENT DOCUMENTS

| JP | 9-046485 A | 2/1997 |
| JP | 2000-278533 A | 10/2000 |
| JP | 2001-157052 A | 6/2001 |
| JP | 2001-285595 A | 10/2001 |
| JP | 2003-101782 A | 4/2003 |
| JP | 2003-152993 A | 5/2003 |
| JP | 2004-187144 A | 7/2004 |

OTHER PUBLICATIONS

Machine Translation of JP2003101782.*

* cited by examiner

*Primary Examiner* — Benny Q Tieu
*Assistant Examiner* — Paul F Payer
(74) *Attorney, Agent, or Firm* — Rossi, Kimms & McDowell LLP

(57) ABSTRACT

An image reading apparatus which approximates the MTF characteristics on the front and back surfaces of the original to each other, in reading a double-sided original, to thereby prevent a density difference and a color difference from being caused between the front and back surfaces of the original. A CCD line sensor and a CIS read front and back surfaces of the double-sided original to output image data. The filter coefficients of first and second MTF correction filters are set for use in a plurality of areas arranged by dividing respective reading ranges of the CCD line sensor and the CIS. The first and second MTF correction filters correct the MTF characteristics of the image data output from the CCD line sensor and the CIS, using the set filter coefficients for associated areas.

17 Claims, 22 Drawing Sheets

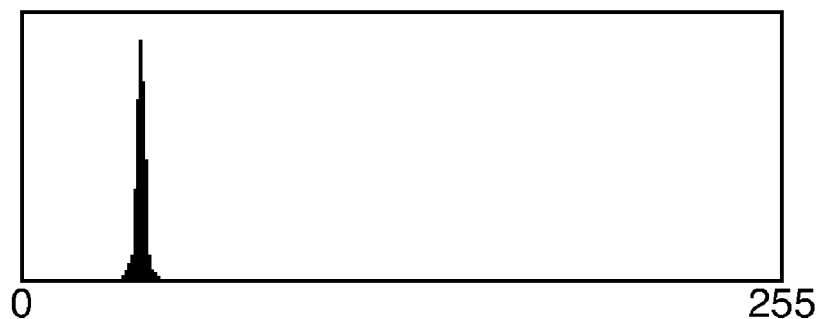
*FIG. 6A* HISTOGRAM OF BLACK REFERENCE
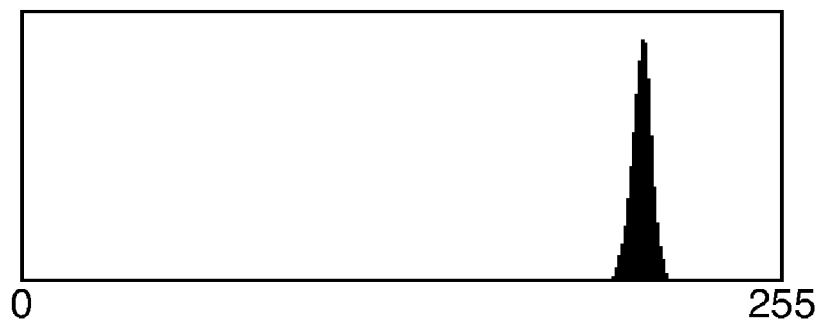
*FIG. 6B* HISTOGRAM OF WHITE REFERENCE
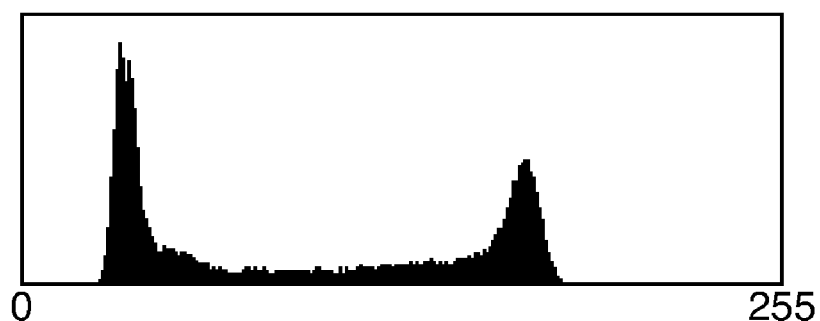
*FIG. 6C* HISTOGRAM OF 6 lp/mm

| MTF | LEFT | CENTER | RIGHT |
|---|---|---|---|
| CCD (MAIN SCANNING) | 67% | 61% | 62% |
| CCD (SUB SCANNING) | 58% | 53% | 60% |
| CIS (MAIN SCANNING) | 78% | 60% | 72% |
| CIS (SUB SCANNING) | 69% | 72% | 74% |

FIG. 11

```
         START
           ↓
S1101 — SELECT REFERENCE VALUES IN
         MAIN AND SUB SCANNING DIRECTIONS
           ↓
S1102 — CALCULATE MTF CORRECTION RATIOS
           ↓
S1103 — CALCULATE CORRECTION COEFFICIENTS
           ↓
S1104 — PERFORM LINEAR INTERPORATION
           ↓
          END
```

FIG. 12

| MTF CORRECTION RATIO | LEFT | CENTER | RIGHT |
|---|---|---|---|
| CCD (MAIN SCANNING) | 100% | 98% | 100% |
| CCD (SUB SCANNING) | 100% | 100% | 100% |
| CIS (MAIN SCANNING) | 86% | 100% | 86% |
| CIS (SUB SCANNING) | 84% | 74% | 81% |

FIG. 13A
FILTER FOR REDUCING DIFFERENCES IN MTF CHARACTERISTICS TO 90% IN MAIN SCANNING DIRECTION AND 70% IN SUB SCANNING DIRECTION

| 0 | 0 | -1 | 0 | 0 |
|---|---|---|---|---|
| 0 | 1 | 2 | 1 | 0 |
| -1 | 12 | 98 | 12 | -1 |
| 0 | 1 | 2 | 1 | 0 |
| 0 | 0 | -1 | 0 | 0 |

FIG. 13B
FILTER FOR REDUCING DIFFERENCES IN MTF CHARACTERISTIC TO 70% IN MAIN SCANNING DIRECTION AND 70% IN SUB SCANNING DIRECTION

| 0 | 0 | -1 | 0 | 0 |
|---|---|---|---|---|
| 0 | 2 | 11 | 2 | 0 |
| -1 | 11 | 76 | 11 | -1 |
| 0 | 2 | 11 | 2 | 0 |
| 0 | 0 | -1 | 0 | 0 |

FIG. 13C
FILTER FOR CHANGING DIFFERENCES IN MTF CHARACTERISTIC TO 130% IN MAIN SCANNING DIRECTION AND 80% IN SUB SCANNING DIRECTION

| 0 | 0 | 0 | 0 | 0 |
|---|---|---|---|---|
| 0 | 0 | 11 | 0 | 0 |
| 0 | -14 | 134 | -14 | 0 |
| 0 | 0 | 11 | 0 | 0 |
| 0 | 0 | 0 | 0 | 0 |

FIG. 15

| CORRECTED MTF | LEFT | CENTER | RIGHT |
|---|---|---|---|
| CCD (MAIN SCANNING) | 67% | 58% | 62% |
| CCD (SUB SCANNING) | 58% | 53% | 60% |
| CIS (MAIN SCANNING) | 66% | 60% | 61% |
| CIS (SUB SCANNING) | 59% | 54% | 59% |

FIG. 16

| MTF CORRECTION RATIO | LEFT | CENTER | RIGHT |
|---|---|---|---|
| CCD (MAIN SCANNING) | 86% | 100% | 93% |
| CCD (SUB SCANNING) | 91% | 100% | 88% |
| CIS (MAIN SCANNING) | 90% | 100% | 98% |
| CIS (SUB SCANNING) | 92% | 100% | 91% |

FIG. 17

| CORRECTED MTF | LEFT | CENTER | RIGHT |
|---|---|---|---|
| CCD (MAIN SCANNING) | 57% | 58% | 59% |
| CCD (SUB SCANNING) | 52% | 53% | 54% |
| CIS (MAIN SCANNING) | 60% | 60% | 61% |
| CIS (SUB SCANNING) | 53% | 54% | 53% |

FIG. 18

| MTF CORRECTION RATIO | LEFT | CENTER | RIGHT |
|---|---|---|---|
| CCD (MAIN SCANNING) | 90% | 98% | 97% |
| CCD (SUB SCANNING) | 91% | 100% | 88% |
| CIS (MAIN SCANNING) | 77% | 100% | 83% |
| CIS (SUB SCANNING) | 77% | 74% | 72% |

FIG. 19

| CORRECTED MTF | LEFT | CENTER | RIGHT |
|---|---|---|---|
| CCD (MAIN SCANNING) | 61% | 60% | 61% |
| CCD (SUB SCANNING) | 54% | 53% | 55% |
| CIS (MAIN SCANNING) | 60% | 60% | 58% |
| CIS (SUB SCANNING) | 52% | 54% | 53% |

FIG. 25A

CASE OF FLOW 2-1

| RANGE | 1 | 2 | 3 | 4 | 5 | 6 | 7 | 8 | 9 |
|---|---|---|---|---|---|---|---|---|---|
| INTER-AREA RELATIONSHIP | D | D | — | D | D | C | — | C | C |

FIG. 25B

CASE OF FLOW 2-2

| RANGE | 1 | 2 | 3 | 4 | 5 | 6 | 7 | 8 | 9 |
|---|---|---|---|---|---|---|---|---|---|
| INTER-AREA RELATIONSHIP | B | A | A | B | — | A | B | E | A |

FIG. 25C

CASE OF FLOW 2-3

| RANGE | 1 | 2 | 3 | 4 | 5 | 6 | 7 | 8 | 9 |
|---|---|---|---|---|---|---|---|---|---|
| INTER-AREA RELATIONSHIP | — | A | A | B | A | A | C | A | A |

IMAGE READING APPARATUS AND METHOD FOR ADJUSTING SAME

BACKGROUND OF THE INVENTION

1. Field of the Invention

The present invention relates to an image reading apparatus and a method for adjusting the same, and more particularly to an image reading apparatus that corrects MTF characteristics of at least one of image data read from a first surface and a second surface of a double-sided original, and a method for adjusting the same.

2. Description of the Related Art

Conventionally, as an image reading apparatus for use in a copying machine or the like, there has been proposed an image reading apparatus which performs so-called "moving original reading" (see e.g. Japanese Laid-Open Patent Publication (Kokai) No. 2001-285595). In the image reading apparatus, originals are conveyed by an original conveying device, page by page, onto an original platen glass, and the original is exposed to light by an exposure device fixed in facing relation to a conveying passage so as to read an image on each original.

Further, conventionally, an image reading apparatus has been proposed which is provided with two image readers so as to read the front and back surfaces of the original only by one original conveyance, for improved original reading speed (see e.g. Japanese Laid-Open Patent Publication (Kokai) No. 2004-187144).

Image reading apparatuses of the above-mentioned kind include an image reading apparatus which is provided with a reducing optical system using a CCD (Charge Coupled Device) line sensor and a reducing lens, and a unity magnification optical system using a CIS (Contact Image Sensor). Such an image reading apparatus suffers from differences in density characteristics and MTF (Modulation Transfer Function) characteristics occurring between the front and back surfaces of an original. When a pattern of stripes of light and shade is formed through an optical system, a contrast between light and shade stripes in the pattern is degraded by the diffraction and aberration of the optical system. The term "MTF characteristics" is intended to mean the degree of degradation of the contrast in the pattern of light and shade stripes. The contrast is more largely degraded as the frequency (spatial frequency) of the pattern becomes higher.

Further, in the above-described image reading apparatus, when an original contains a mixture of images formed by different density reproduction methods, such as continuous images and halftone-dotted images, small differences in the MTF characteristics make the differences in density conspicuous.

Furthermore, also when optical systems of the same type are used for reading the front and back surfaces of an original, respectively, there similarly occur different reading characteristics between the front and back surfaces of the original due to different assemblies of component parts of the optical systems, different spectral characteristics of the same, etc.

Out of the differences in reading characteristics, the differences in the MTF characteristics have conventionally been reduced by an image reading apparatus that performs adjustment of a reading optical system, or MTF filtering or smoothing filtering on image data read from an original (see e.g. Japanese Laid-Open Patent Publication (Kokai) No. 2001-157052 (Patent No. 3660180)). This image reading apparatus reduces variation in the MTF characteristics in the same plane of the original, and the differences in the MTF characteristics between the front and back surfaces of the original.

However, the conventional image reading apparatus disclosed in Japanese Laid-Open Patent Publication (Kokai) No. 2001-157052 (Patent No. 3660180) is assumed to uniformly perform MTF filtering or smoothing filtering in the same plane of the original.

Even when the MTF filtering is uniformly performed in a plane, if there is a large variation in the MTF characteristics in the plane, e.g. if there is a large difference in the MTF characteristics between an end of the original and a central portion thereof, it is sometimes impossible to obtain desired results from the MTF filtering.

Further, even when an MTF filter is changed between reading modes, such as a pressure plate reading mode (fixed original reading mode) and a moving original reading mode, if the MTF characteristics largely vary in the same plane or between the front and back surfaces of the original, it is difficult to match the MTF characteristics precisely between the front and back surfaces of the original or reduce variation in the MTF characteristics in the same plane, for the same reason described above.

Therefore, the prior art suffers from a limited reduction of occurrence of moire in the same plane or a limited reduction of the color differences between the front and back surfaces of an original.

SUMMARY OF THE INVENTION

The present invention provides an image reading apparatus which approximates the MTF characteristics on the front and back surfaces of the original to each other, in reading a double-sided original, to thereby prevent density differences and color differences from being caused between the front and back surfaces of the original, and a method for adjusting the same.

In a first aspect of the present invention, there is provided an image reading apparatus comprising a first reading unit configured to read a first surface of an original, and output image data of the read first surface, a second reading unit configured to read a second surface of the original, and output image data of the read second surface, and an MTF correction unit configured to perform MTF ((Modulation Transfer Function) correction on the image data output from at least one of the first and second reading units, wherein the MTF correction unit performs the MTF correction on the image data such that MTF characteristics of the first reading unit and MTF characteristics of the second reading unit are approximated to each other.

With this configuration, in reading a double-sided original, it is possible to approximate the MTF characteristics to each other between the front and back surfaces of the original, to thereby prevent differences in density and color from being caused between the front and back surfaces of the original.

The first and second reading units can have reading methods different from each other.

One of the first and second reading units can be of a reducing optical system, and the other thereof can be of a unity magnification optical system.

The reading unit of the reducing optical system can be a CCD (Charge Coupled Device) line sensor, and the reading unit of the unity magnification optical system can be a CIS (Contact Image Sensor).

The MTF correction unit can perform the MTF correction such that MTF characteristics of the reading unit of the unity magnification optical system are approximated to MTF characteristics of the reading unit of the reducing optical system.

The MTF correction unit can perform the MTF correction such that MTF characteristic values of one of the reading units having higher MTF characteristic values are approximated to MTF characteristic values of the other of the reading units.

The MTF correction unit can correct the MTF characteristics in a main scanning direction and the MTF characteristics in a sub scanning direction.

The MTF correction unit can correct MTF characteristics of each of a plurality of areas divided along a main scanning direction.

The MTF correction unit can perform the MTF correction using a smoothing filter or an edge enhancement filter.

In a second aspect of the present invention, there is provided an image reading apparatus comprising a first reading unit configured to read a first surface of an original, and output image data of the read first surface, a second reading unit configured to read a second surface of the original, and output image data of the read second surface, and an MTF correction unit configured to perform MTF correction on the image data output from at least one of the first and second reading units, wherein the MTF correction unit performs the MTF correction on the image data such that MTF characteristics of the first reading unit and MTF characteristics of the second reading unit correspond to each other.

In a third aspect of the present invention, there is provided a method for adjusting an image reading apparatus, the image reading apparatus including a first reading unit configured to read a first surface of an original, and output image data of the read first surface, a second reading unit configured to read a second surface of the original, and output image data of the read second surface, and an MTF correction unit configured to perform MTF correction on the image data output from at least one of the first and second reading units, the method comprising having the first reading unit and the second reading unit read a reference original, and having the MTF correction unit perform the MTF correction on the basis of image data of the reference original such that MTF characteristics of the first reading unit and MTF characteristics of the second reading unit correspond to each other.

The MTF correction step can have the MTF correction unit perform the MTF correction such that MTF characteristics of the first reading unit and MTF characteristics of the second reading unit are approximated to each other.

The features and advantages of the invention will become more apparent from the following detailed description taken in conjunction with the accompanying drawings.

BRIEF DESCRIPTION OF THE DRAWINGS

FIGS. 6A to 6C are views of histograms obtained by reading the FIG. 4 MTF characteristic evaluation chart.

FIG. 11 is a flowchart showing a process for calculating filter coefficients of MTF correction filters.

FIG. 12 is a table of MTF correction ratios calculated based on the MTF characteristic values shown in FIG. 9, for reducing the differences in MTF characteristics between front and back surfaces of the original.

FIGS. 13A to 13C are tables of examples of the filter coefficients of the MTF correction filters.

FIG. 15 is a table of MTF characteristic values on the front and back surfaces of the original, which are obtained by using the MTF correction filter calculated based on the FIG. 12 MTF correction ratios.

FIG. 16 is a table of MTF correction ratios calculated based on the FIG. 15 MTF characteristic values, for reducing differences in the MTF characteristics between respective areas (left, central, and right areas).

FIG. 17 is a table of corrected MTF values (MTF characteristic values) obtained by correcting the MTF characteristics of the FIG. 15 corrected MTF characteristic values on the front and back surfaces of the original, using the filter coefficients calculated by the FIG. 11 process, so as to reduce the differences in the MTF characteristics in the main scanning direction.

FIG. 18 is a view of MTF correction ratios for reducing, at a time, the differences in the MTF characteristics between the front and back surfaces of the original and the differences in the MTF characteristics between areas (left, central, and right), which are calculated based on the MTF characteristic values shown in FIG. 9.

FIG. 19 is a table of MTF characteristic values on the front and back surfaces of the original, which are obtained by using the MTF correction filter calculated based on the FIG. 18 MTF correction ratios.

FIGS. 25A to 25C are tables showing correspondence between ranges 1 to 9 determined by the classification process shown in FIGS. 21 to 23, and the inter-area relationship between the MTF correction ratios shown in FIGS. 24A to 24E.

DETAILED DESCRIPTION OF THE PREFERRED EMBODIMENTS

The present invention will now be described in detail below with reference to the accompanying drawings showing preferred embodiments thereof.

Figure 1:
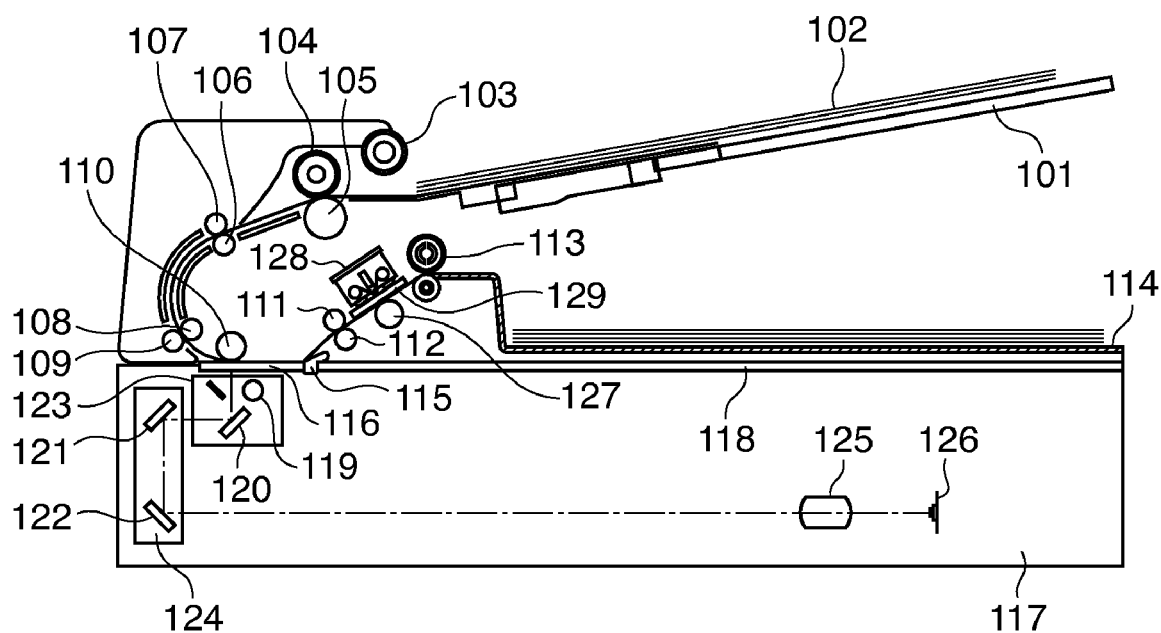
FIG. 1 is a side view of an image reading apparatus according to a first embodiment of the present invention.
Figure 2:
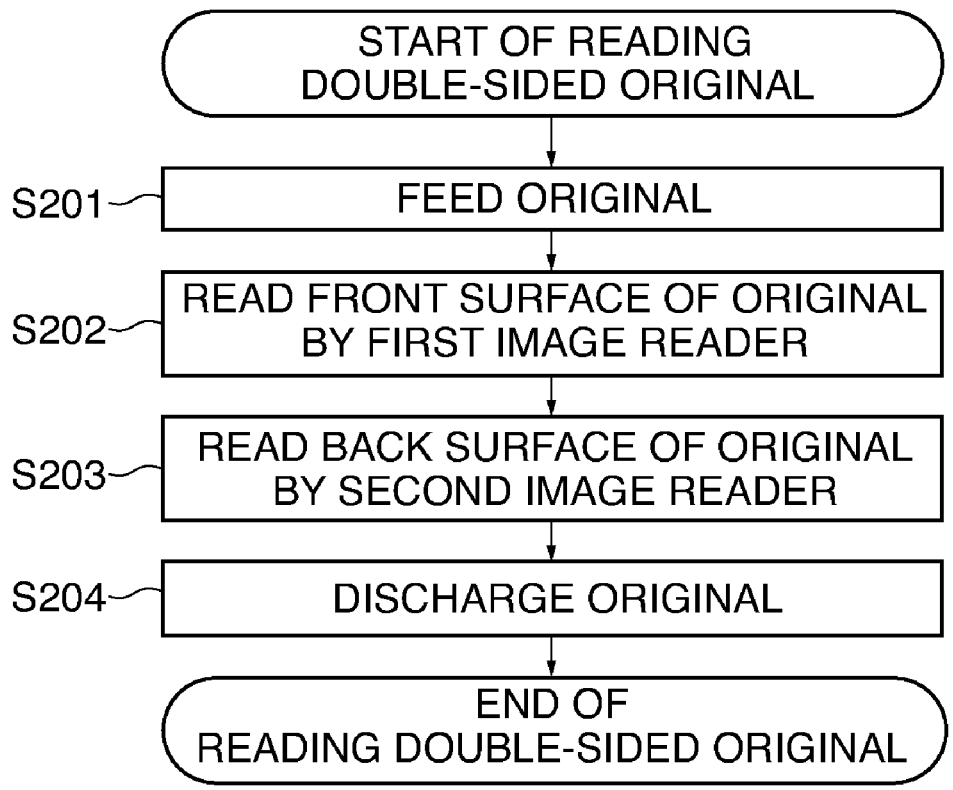
FIG. 2 is a flowchart of a process for a double-sided original reading operation executed by the image reading apparatus shown in FIG. 1.

FIG. 1 is a side view of an image reading apparatus according to a first embodiment of the present invention. The image reading apparatus has an automatic original feeder mounted thereon. Further, FIG. 2 is a flowchart of a process for a double-sided original reading operation executed by the image reading apparatus shown in FIG. 1. Hereinafter, the arrangement of the image reading apparatus will be described with reference to FIG. 1, and the double-sided original reading operation executed by the image reading apparatus will be described with reference to steps shown FIG. 2, as required.

Referring to FIG. 1, reference numeral 100 designates the automatic original feeder. Reference numeral 101 designates an original tray for stacking originals 102. A sheet feed roller 103 is disposed at a location above the original tray 101. The sheet feed roller 103 is connected to the same drive source as a separating and conveying roller 104 is, and rotates along with rotation of the driving power source to feed each original (step S201).

Normally, the sheet feed roller 103 is in a retracted home position above the front end of the original tray 101 so as not to interfere with an operation for setting the originals 102 on the original tray 101. When an original feed operation is started, the sheet feed roller 103 moves downward to be brought into abutment with the upper surface of an uppermost one of the stacked originals 102. Since the sheet feed roller 103 is pivotally supported on an arm, not shown, it is vertically moved along with the swing of the arm.

A separating and conveying driven roller 105 is disposed at a location opposed to the separating and conveying roller 104, and is urged toward the same. The separating and conveying driven roller 105 is formed e.g. of a rubber material having a slightly smaller friction than that of the separating and conveying roller 104, and cooperates with the separating and conveying roller 104 to separate the originals 102 conveyed by the sheet feed roller 103, one by one, and feed each separated original 102.

A registration roller 106 and a registration driven roller 107 align the leading end of the original 102 fed from the separating and conveying roller 104 and the separating and conveying driven roller 105. More specifically, the leading end of the original 102 fed from the separating and conveying roller 104 and the separating and conveying driven roller 105 is brought into abutment with a nip between the registration roller 106 and registration driven roller 107 at rest, whereby a loop (bend) is formed on the original 102, which corrects the skew of the original. After that, when the registration roller 106 and registration driven roller 107 rotate, a lead roller 108 and a lead driven roller 109 convey the original toward a moving original reading glass 116. A platen roller 110 is disposed at a location opposed to the moving original reading glass 116.

A CCD (Charge Coupled Device) line sensor 126 (first image reader) of an image reading unit 117 reads image information on the front surface of the original 102 passing over the moving original reading glass 116 (step S202). After reading the image on the front surface of the original by the CCD line sensor 126, a lead delivery roller 111 and a lead delivery driven roller 112 cooperate to convey the original toward a CIS (contact image sensor) 128 (second image reader). Reference numeral 115 designates a jump base for picking up a sheet (original) from the moving original reading glass 116. The CIS 128 is provided with a moving original reading glass 129, and a platen roller 127 is disposed in a manner opposed to the moving original reading glass 129. The CCD line sensor 126 is an image reader of a reducing optical system, using a reducing lens, and the CIS 128 is an image reader of a unity magnification optical system.

The CIS 128 (second image reader) reads image information from the back surface of the original 102 passing over the moving original reading glass 129 (step S203). After termination of reading of the image on the back surface of the original by the CIS 128, a discharging roller pair 113 discharge the original 102 onto a stacking tray 114(step S204).

The image reading unit 117 is comprised of a lamp 119 for irradiating light onto the surface of the original 102, from which image information is to be read, and mirrors 120, 121, and 122 for guiding reflected light from the original to a lens 125 and the CCD line sensor 126. The lamp 119 and the mirror 120 are mounted on a first mirror base 123. Further, the mirrors 121 and 122 are mounted on a second mirror base 124.

The mirror bases 123 and 124 are connected to a drive motor, not shown, by a wire, not shown, such that when the drive motor is driven for rotation, they are moved along an original platen glass 118 in parallel therewith. Reflected light from the original 102 is guided via the mirrors 120, 121, and 122 to the lens 125, through which an optical image is formed on a light receiving part of the CCD line sensor 126. The CCD line sensor 126 photoelectrically converts the reflected light forming the image and outputs an electric signal corresponding to the amount of received light.

Similarly, the CIS 128 of the second image reader photoelectrically converts reflected light from the original 102 by a light-receiving element thereof to deliver an electric signal corresponding to the amount of the received light.

The image reading apparatus configured as described above is capable of reading an original in two reading modes, i.e. an fixed original reading mode and a moving original reading mode. In the fixed original reading mode, an original 102 is set on the original platen glass 118, and is read while the first mirror base 123 and the second mirror base 124 are moved in a sub scanning direction (rightward as viewed in FIG. 1). In the moving original reading mode, in a state in which the first and second mirror bases 123 and 124 are at rest, an original 102 is read at the position of the moving original reading glass 116 while being conveyed by the automatic original feeder 100. In the moving original reading mode, it is also possible to read image information on the back surface of the original 102 using the CIS 128 via the moving original reading glass 129.

When image information on the front and back surfaces of the original 102 is read in the moving original reading mode, the differences in reading characteristics between the CCD line sensor 126 and the CIS 128 appear as differences in density characteristics and MTF characteristics. Therefore, even when the same original is read by the first image reader and the second image reader, there sometimes appear large differences between images read by them.

Particularly in the case of an original prepared e.g. by offset printing and formed by an image of halftone dots, small differences in the MTF characteristics appear as conspicuous differences in density. Further, when the original is colored, if the above-mentioned differences in the MTF characteristics exist between the first image reader and the second image reader, they appear as color differences between an image formed by reading the front surface of the original and an image formed by reading the back surface thereof. Furthermore, when variation in the MTF characteristics is caused in the same plane of the original read by the first image reader or the second image reader, a density variation and a color variation are caused in the same plane of the original, which adversely affects the image of the original.

Therefore, when images on the front and back surfaces of the original are simultaneously read in the moving original reading mode, if the differences in the MTF characteristics between the first image reader and the second image reader (hereinafter referred to as "the differences in the MTF characteristics between the front and back surfaces of the original), and the variation in the MTF characteristics in the same plane of the original read by the first image reader or the second image reader are reduced, it is possible to reduce the color differences in the same plane of the original and the color differences between the front and back surfaces of the original.

Hereinafter, a method of reducing the differences in the MTF characteristics between the front and back surfaces of the original will be described using an example.

In general, the MTF characteristic represents the relationship between the spatial frequency and the contrast of am image. More specifically, an image (wave-shaped striped image) having a certain spatial frequency is read, and the contrast of the image reproduced based on obtained image data is measured. The contrast is associated with a corresponding spatial frequency. Lower MTF characteristics blur the image, while higher MTF characteristics increase the sharpness of the image.

Figure 3A:
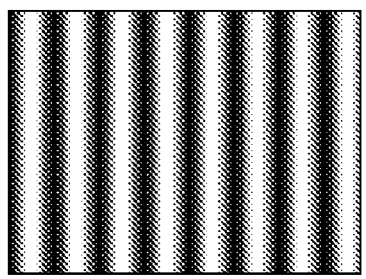
FIGS. 3A and 3B are views showing examples of an MTF characteristic evaluation chart for use in measuring MTF characteristics.
Figure 3B:
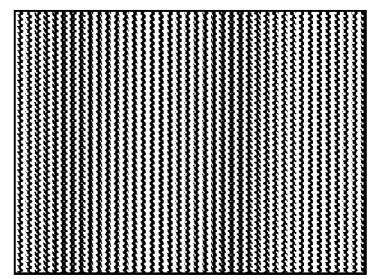

Examples of an MTF characteristic evaluation chart for use in measuring the MTF characteristics are shown in FIGS. 3A and 3B. FIG. 3A shows an example of a chart having a low spatial frequency, while FIG. 3B shows an example of a chart having a high spatial frequency.

For example, when the resolution of an image reader e.g. for a copying machine is equal to 600 dpi, the MTF characteristics are measured using an MTF characteristic evaluation chart having 6 lp/mm. Now, "lp/mm" is a unit indicative of how many black lines exist per 1 mm in the MTF characteristic evaluation chart, and "lp" is an abbreviation of line pair.

Let it be assumed that the number of lines of an MTF characteristic evaluation chart (the number of chart lines) employed satisfies the following equation (1) wherein the symbol "*" is intended to mean "× (multiplied by)":

$$4 * \text{chart line number [lp/mm]} < \text{basic resolution [dpi] of the image reading apparatus}/25.4 \quad (1)$$

It should be noted that the sampling theorem requires a line of 1 lp/mm to be projected over minimum 4 pixels of the CCD line sensor 126, and hence a limit value theoretically measurable becomes equal to 4*chart line number [lp/mm].

Next, a description will be given of a method of measuring the MTF characteristics.

Figure 4:
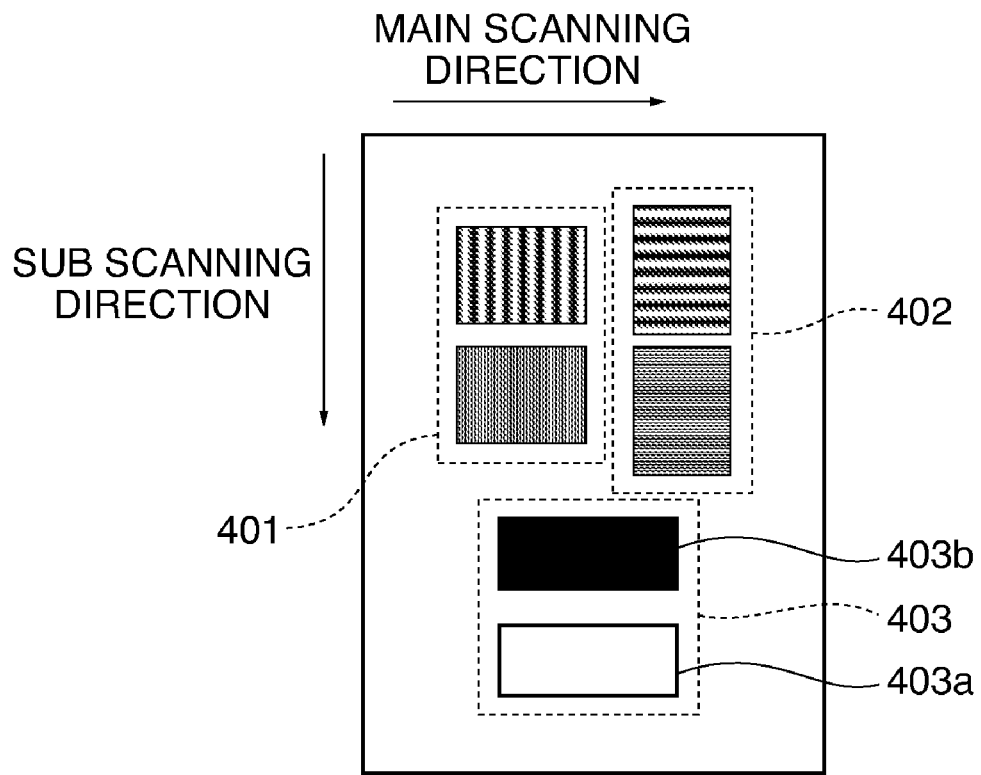
FIG. 4 is a view showing an example of the MTF characteristic evaluation chart for use in measuring the MTF characteristics.

FIG. 4 is a view showing an example of the MTF characteristic evaluation chart for use in measuring the MTF characteristics.

In FIG. 4, reference numeral 401 designates a portion of the chart for use in measuring the MTF characteristics in the main scanning direction, and reference numeral 402 designates a portion of the chart for use in measuring the MTF characteristics in the sub scanning direction, while reference numeral 403 designates a portion of the chart indicating white and black references. In the portion 403, the white reference 403a is a base portion of the chart, and the black reference 403b is a portion filled with black ink in which are printed lines written in the chart.

Figure 5:
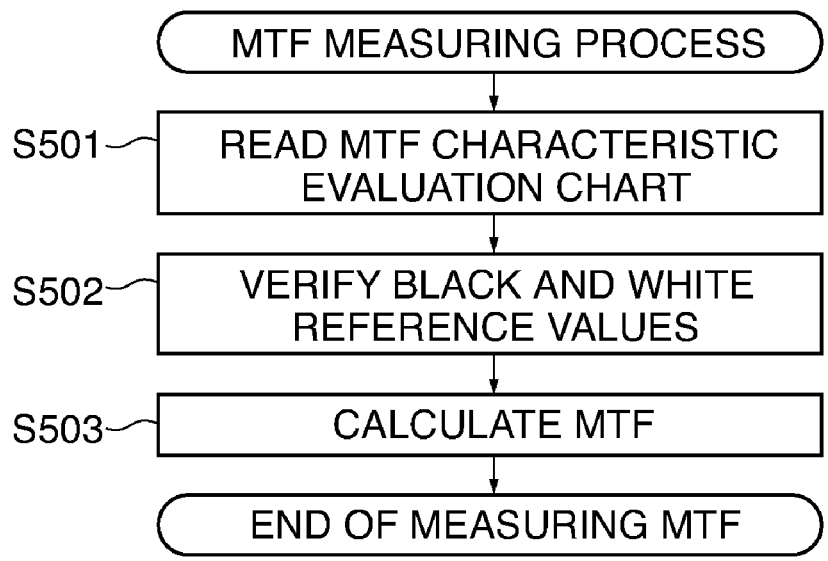
FIG. 5 is a flowchart showing a process for measuring the MTF characteristics.

FIG. 5 is a flowchart showing a process for measuring the MTF characteristics.

First, in a step S501, the FIG. 4 MTF characteristic evaluation chart is read by the image reading unit 117, to thereby obtain histograms associated with the respective portions 401, 402, and 403. More specifically, the automatic original feeder 100 feeds a sheet of the MTF characteristic evaluation chart set on the original tray 101 with its front surface facing upward, and the lamp 119 is lighted to illuminate the MTF characteristic evaluation chart conveyed onto the moving original reading glass 116, whereby the MTF characteristic evaluation chart is read by the CCD line sensor 126. Then, the automatic original feeder 100 feeds the sheet of the MTF characteristic evaluation chart set on the original tray 101 with its back surface facing upward to the moving original reading glass 116, and the MTF characteristic evaluation chart is illuminated with light from a light source contained in the CIS 128, whereby the chart is read by the CIS 128.

Then, in a step S502, the white reference and the black reference are verified. More specifically, read data evaluation settings of the image reading unit 117 are changed based on the histograms of the white reference 403b and the black reference 403b obtained from the images of the portion 403 shown in FIG. 4. For example, when histograms (in each of which the horizontal axis represents a read luminance, and the vertical axis represents the number of pixels having corresponding read luminance) of the black reference 403a and the white reference 403b, as shown in FIGS. 6A and 6B, are obtained, first, the maximum value and minimum value of the read luminance are extracted from each histogram. Here, when the read luminance of the white reference has a maximum value of 255, the read data evaluation settings of the image reading unit 117 are changed such that the maximum value of the white reference becomes not larger than 255. Further, when the read luminance of the black reference has a minimum value of 0, the read data evaluation settings of the image reading unit 117 are changed such that the minimum value of the black reference becomes not smaller than 1.

In the next step S503, there are calculated the MTF characteristic value of the MTF measuring image 401 in the main scanning direction and that of the MTF measuring image 402 in the sub scanning direction of the FIG. 4 MTF characteristic evaluation chart. More specifically, e.g. when a histogram, as shown in FIG. 6C, of the MTF measuring image 401 appearing in FIG. 4 is obtained, the maximum value and minimum value of the MTF measuring image 401 are extracted from the histogram. More specifically, a value of a peak having a larger read luminance of two peaks appearing in the histogram is extracted as the maximum value (max), and a peak value of a peak having a smaller read luminance of the two peaks is extracted as the minimum value (min).

Subsequently, using the above-described maximum values and minimum values of the respective MTF measuring images 401 and 402 in the MTF characteristic evaluation chart, the MTF characteristic values in the main scanning direction and the sub scanning direction are calculated by the following equation (2):

$$MTF = \frac{\max - \min}{\max + \min} \Lambda \quad (2)$$

In the above equation, however, the MTF characteristic values are calculated assuming that the gamma value of the image reader is equal to 1.0. If the gamma value of the image reader is equal to a value other than 1.0, it is necessary to apply the above equation (2) after the MTF characteristic values are once normalized by the following equation (3):

$$\max' = 255 \times 10^{\frac{\log\left(\frac{\max}{255}\right)}{g}}, \min' = 255 \times 10^{\frac{\log\left(\frac{\min}{255}\right)}{g}} \Lambda \quad (3)$$

wherein g represents the gamma value.

The above-described method of measuring the MTF characteristics is carried out using a black and white line chart, as illustrated in FIG. 4, and is accurately called a CTF (Contrast Transfer Function). The precise method of measuring the MTF characteristics is carried out using a chart having a density period represented by the sinusoidal function sin of the trigonometric function.

Next, image processing executed by the image reading apparatus will be described with reference to FIG. 7.

Figure 7:
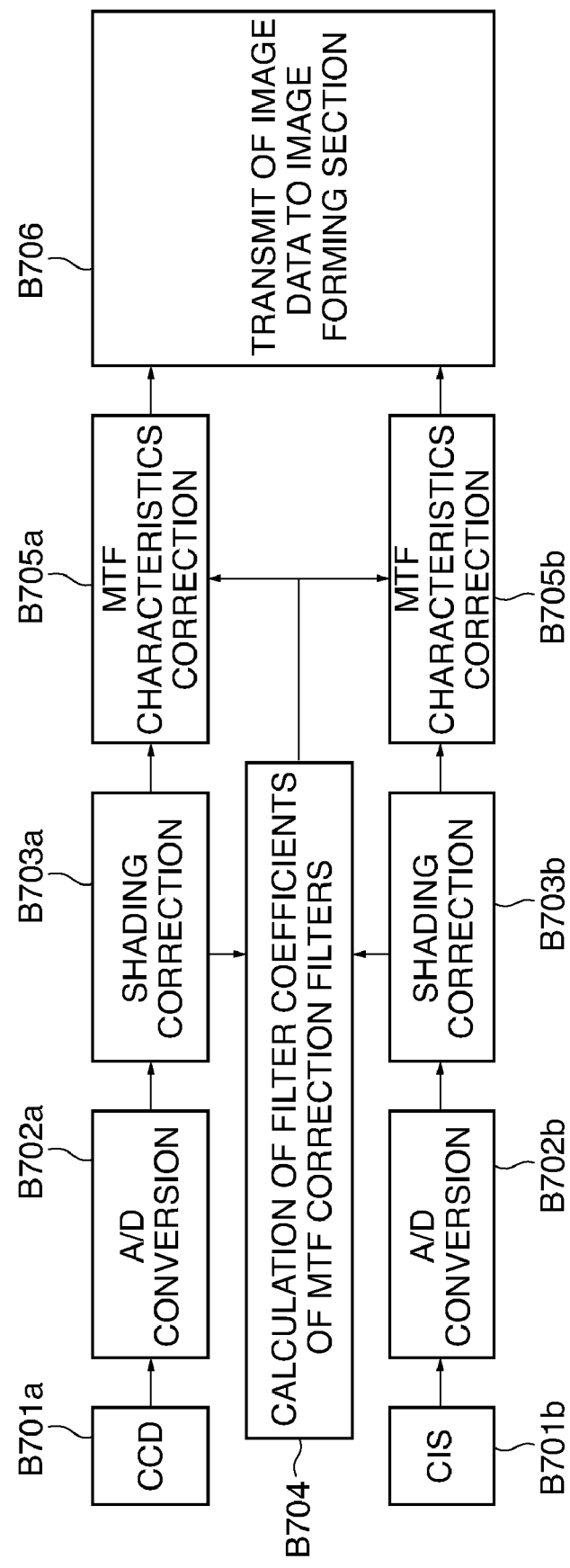
FIG. 7 is a functional block diagram associated with image processing executed by the FIG. 1 image reading apparatus.

FIG. 7 is a functional block diagram associated with the image processing executed by the FIG. 1 image reading apparatus. It should be noted that the image reading apparatus is provided with an information processing device, not shown, which is comprised of a CPU, a ROM, a RAM, and an input/output device, and the information processing device executes control programs, whereby the above image processing is performed.

Blocks B701a and B701b output respective image data read by the CCD line sensor 126 and the CIS 128 as analog signals. These analog signals are converted to digital signals by blocks B702a and B702b, respectively. The image data converted to the digital signals are subjected to shading correction by blocks B703a and B703b, respectively.

In the shading correction, to correct pixel-by-pixel variation of image data caused during reading of the image data by image pickup sensors, such as the CCD line sensor 126 and the CIS 128, a adjusted gain value and an adjusted offset value are set on a pixel-by-pixel basis, as described hereinafter.

First, a white reference original for shading is fed by the automatic original feeder 100, and the lamp 119 is lighted to illuminate the white reference original fed onto the moving original reading glass 116, whereby the white reference original is read by the CCD line sensor 126. Thus, shading data on the first image reader side is obtained. Then, the white reference original is moved onto the moving original reading glass 129, and is illuminated by light from the light source contained in the CIS 128, whereby the white reference original is read by the CIS 128. Thus, shading data on the second image reader side is obtained. Then, a gain value is adjusted on a pixel-by-pixel basis such that the luminance value of each pixel of the shading data thus obtained by the CCD line sensor 126 and the CIS 128 becomes equal to a predetermined target value (e.g. a luminance value of 245). The thus obtained adjusted gain values are stored as shading correction data.

Subsequently, data are obtained which are output from the CCD line sensor 126 and the CIS 128 in a state in which the lamps of the CCD line sensor 126 and the CIS 128 are turned off. Then, offset adjustment is performed on a pixel-by-pixel basis such that the luminance value of each pixel (black offset value) of the data becomes equal to a predetermined target value (e.g. a luminance value of 5). The thus obtained adjusted offset values are stored as shading correction data.

Blocks B703a and 703b carry out shading correction on original image data obtained from the CCD line sensor 126 and the CIS 128, using the thus stored shading correction data.

A block B704 calculates filter coefficients of MTF correction filters for use in correction of the MTF characteristics, based on the image data subjected to the shading correction. A method of calculating the filter coefficients will be described hereinafter with reference to FIG. 11.

Blocks B705a and 705b correct the MTF characteristics of the respective image data items subjected to the shading correction, using the filter coefficients calculated by the block B704. This correction makes it possible to reduce the differences in the MTF characteristics not only in the same plane of the original but also between the front and back surfaces of the original. The image data corrected as above are sent to an image forming section from a block B706.

Next, a description will be given of the method of calculating the filter coefficients of the MTF correction filters for use in the correction of the MTF characteristics, and the effects of the correction by the method.

Figure 8:
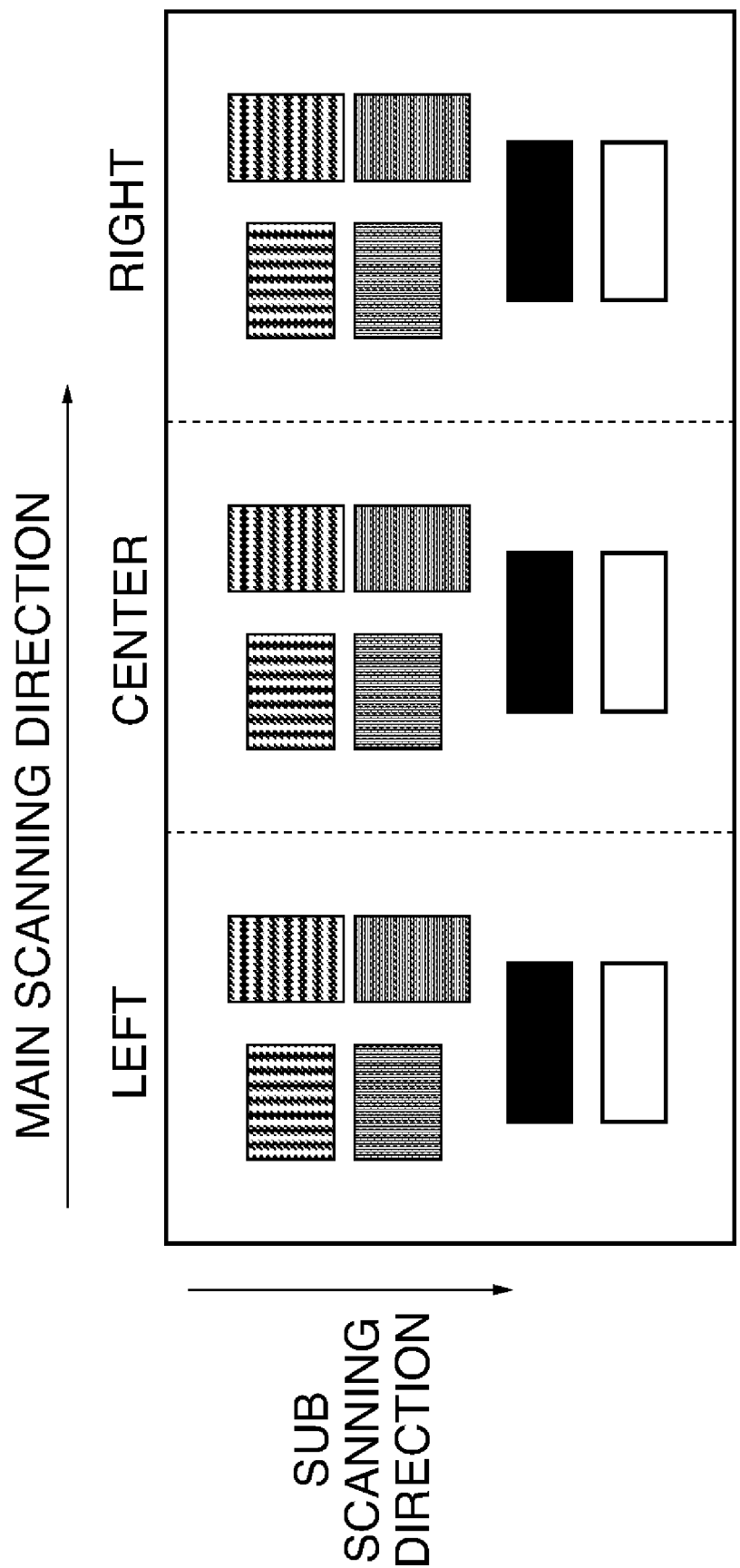
FIG. 8 is a view of an MTF characteristic evaluation chart obtained by dividing an image area into three parts along a main scanning direction.

FIG. 8 is a view of an MTF characteristic evaluation chart obtained by dividing an image area into three parts along the main scanning direction.

In this chart, the image area is divided into a left area, a central area, and a right area. Each of the areas is configured similarly to the MTF characteristic evaluation chart shown in FIG. 4. This chart is configured assuming that reading of image data is performed in a direction indicated by an arrow appearing in FIG. 8.

Figures 9, 10:
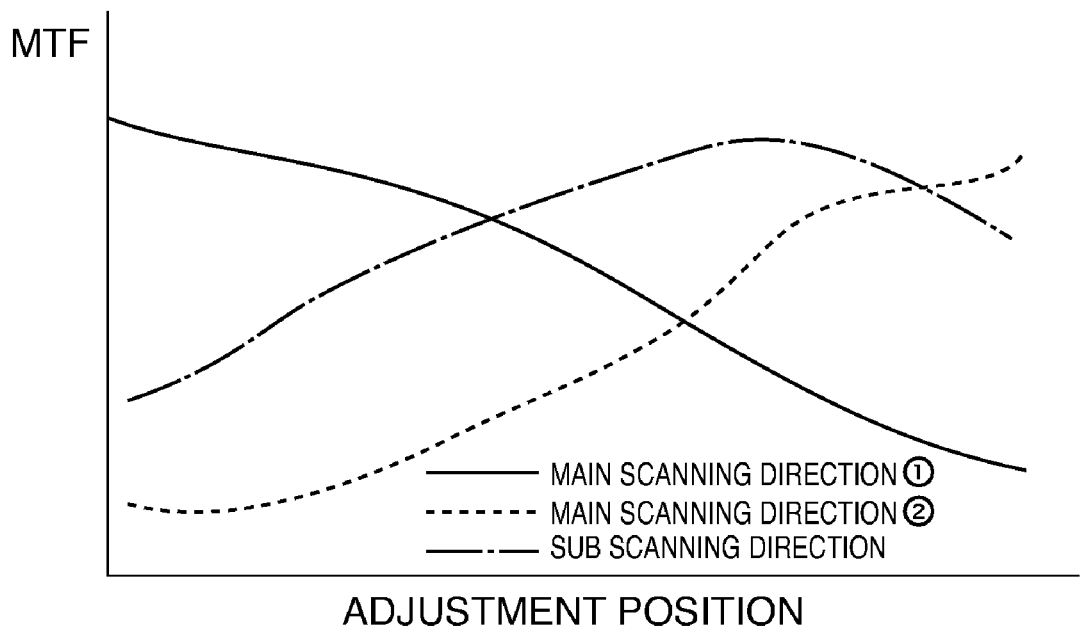
FIG. 9 is a table of the results of measurement of the MTF characteristics of the image reading apparatus having a CCD line sensor and a CIS mounted therein, using the FIG. 8 MTF characteristic evaluation chart.
FIG. 10 is a graph showing changes in MTF characteristic values with respect to adjustment positions and scanning directions.

FIG. 9 is a table of the results of measurement of the MTF characteristics of the image reading apparatus having the CCD line sensor 126 and the CIS 128 mounted therein, using the FIG. 8 MTF characteristic evaluation chart. It should be noted that the results shown here are obtained using an MTF characteristic evaluation chart of 6 lp/mm.

FIG. 9 shows MTF characteristic values obtained by the CCD line sensor 126 when it read the left area, the central area, and the right area of the FIG. 8 MTF characteristic evaluation chart, and MTF characteristic values obtained by the CIS 128 when it read the left area, the central area, and the right area of the FIG. 8 MTF characteristic evaluation chart.

As is apparent from the MTF characteristic values shown in FIG. 9, variation in the MTF characteristics is caused in the same plane (between the left area, the central area, and the right area) of the original, and the differences in the MTF characteristics are caused between the front and back surfaces of the original (between the CCD line sensor and the CIS).

As shown in FIG. 10, the variation in the MTF characteristics in the same plane is caused by a large change in the MTF characteristic values depending on the adjustment position. Now, the term "adjustment position" is intended to mean an adjustment position indicative of the positional relationship between the CCD line sensor and a condenser lens. FIG. 10 is a graph showing changes in the MTF characteristic values with respect to the adjustment position and the scanning direction. Further, in a reducing optical system using the CCD line sensor, the variation in the MTF characteristics in the same plane is caused by the MTF characteristic values being liable to be lowered at ends of the MTF characteristic evaluation chart in the main scanning direction by the influence of a reducing lens. Further, in a unity magnification optical system using the CIS, the focus position of a lens largely varies with the adjustment position of an SLA (SELFOC lens array), which makes the MTF characteristics liable to be varied, whereby the variation in the MTF characteristics in the same plane is caused.

To reduce the differences in the MTF characteristics between the front and back surfaces of the original, and the variation in the MTF characteristics in the same plane of the original, which are caused for the above-described reason, first, the filter coefficients of the MTF correction filters are calculated such that the differences in the MTF characteristics between the front and back surfaces are reduced, and then to reduce the variation in the MTF characteristics in the same plane, the filter coefficients are switched in the same plane. First, a method of reducing the differences in the MTF characteristics between the front and back surfaces will be described hereinafter.

FIG. 11 is a flowchart showing a process for calculating the filter coefficients of the MTF correction filters. It should be noted that this process corresponds to the process carried out by the block B704 appearing in FIG. 7.

In a step S1101, before calculation of the filter coefficients of the MTF correction filters, it is determined which of the MTF characteristic values of the CCD line sensor 126 and those of the CIS 128 should be selected as reference values (target values), so as to match the MTF characteristics between the front and back surfaces of the original.

More specifically, the MTF characteristic values of the CCD line sensor 126 and the CIS 128 in the respective main and sub scanning directions are calculated in each area (of the left, central and right areas). Then, it is determined on an area-by-area basis and on a scanning direction-by-scanning direction basis whether the MTF characteristic values of the CCD line sensor 126 or those of the CIS 128 should be set to the reference values.

More specifically, out of the MTF characteristic values of the left area in the main scanning direction, a smaller one is selected to select the MTF characteristic value of one of the two readers which takes the smaller value. Then, the same selecting process is also performed on the MTF characteristic values of the left area in the sub scanning direction. Furthermore, the same selecting processes are also performed on the MTF characteristic values of the central area and the left area in the main and sub scanning directions.

For example, in the case of the MTF characteristic values shown in FIG. 9, the MTF characteristic values of the left area in the main scanning direction are such that the characteristic value of the CCD is 67% and the characteristic value of the CIS is 78%, and therefore the characteristic value of the CCD is selected. Further, the MTF characteristic values of the right area in the sub scanning direction are such that the characteristic value of the CCD is 60% and the characteristic value of the CIS is 72%, and therefore the characteristic value of the CCD is selected.

In the illustrated example, although each reference value is selected such that one of the readers having a higher MTF characteristic value is matched with the other having a smaller MTF characteristic value, the reference value may be selected such that one of the readers having a smaller MTF characteristic value is matched with the other having a higher MTF characteristic value.

Further, the MTF characteristic values of the CCD line sensor 126 may be selected as reference values in all of the areas and the scanning directions, so as to match the MTF characteristics of the CIS 128 having relatively high MTF characteristic values with the MTF characteristics of the CCD line sensor 126.

In a step S1102, MTF correction ratios are calculated on an area-by-area basis and on a scanning direction-by-scanning direction basis. More specifically, the MTF correction ratio is calculated in each area using the following equation (4):

$$\text{MTF correction ratio} = \text{reference MTF characteristic value} / \text{MTF characteristic value in target area} \quad (4)$$

wherein the reference MTF characteristic value is intended to mean an MTF characteristic value (of the CCD or the CIS) on the front surface or the back surface, selected in the step S1101, and the MTF characteristic value in target area is intended to mean an MTF characteristic value (of the CCD or the CIS) on the back surface or the front surface, associated with the reference MTF characteristic value.

FIG. 12 is a table of the MTF correction ratios for the respective areas, calculated by the above equation (4), based on the MTF characteristic values shown in FIG. 9.

In a step S1103, the filter coefficients (correction coefficients) of the MTF correction filters, for realizing the MTF correction ratios calculated in the step S1102, are calculated.

FIGS. 13A to 13C are tables of examples of the filter coefficients of the MTF correction filters.

It should be noted that in general, a smoothing filter (LPF: low-pass filter) or an edge enhancement filter (HPF: high-pass filter) is used for the MTF correction filter. A method of deriving filter coefficients of the smoothing filter or the edge enhancement filter is described in detail in another literature (e.g. "Practical Digital Video Image Processing Learned in C Language" by Seiki Inoue, published by Ohmsha, Ltd), and description thereof is omitted).

In a step S1104, linear interpolation calculation of the filter coefficients of the MTF correction filters is carried out between the areas by the following equation (5):

$$\text{LINEAR} - \text{INTERPOLATED DATA} = \frac{(\text{WIDTH} - \text{POINT}) * POINT1DATA}{\text{WIDTH}} + \frac{\text{POINT} - POINT2DATA}{\text{WIDTH}} \Lambda \quad (5)$$

wherein POINT1DATA and POINT2DATA represent data values obtained by calculation of the filter coefficients using a 5×5 filter at a switching point 1 and a switching point 2, respectively; POINT represents the number of pixels from the switching point 1 to a target pixel; and WIDTH represents the number of pixels from the switching point 1 to the switching point 2.

Figure 14A:
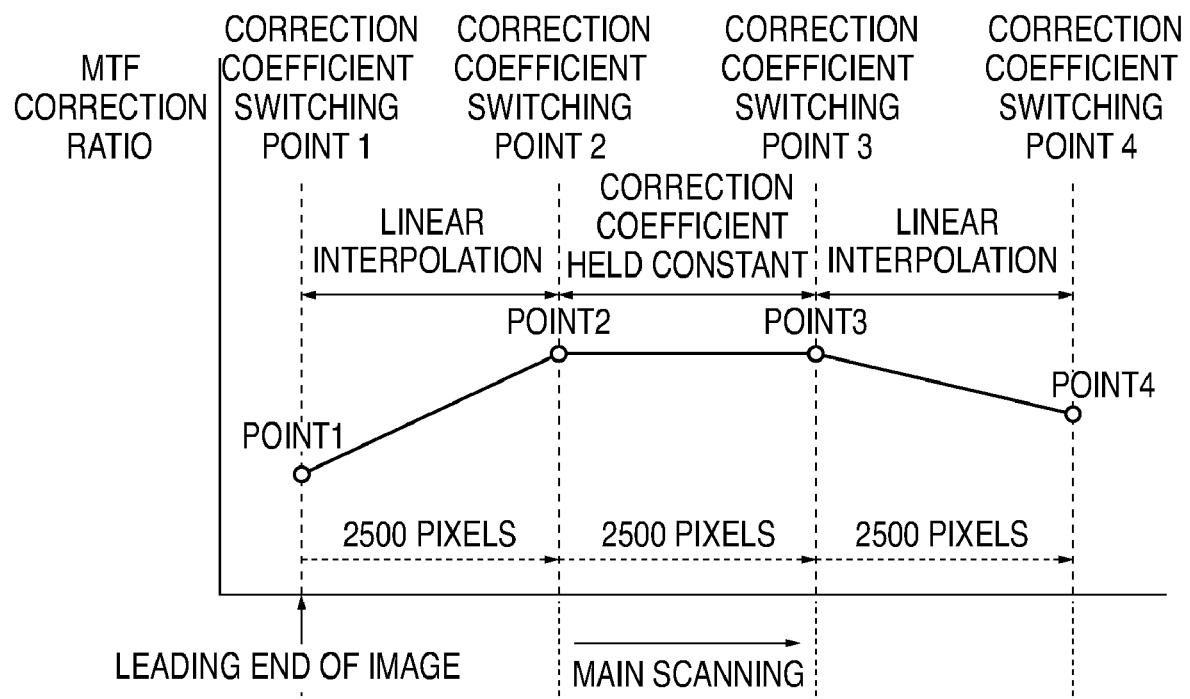
FIGS. 14A and 14B are views showing changes in the MTF correction ratio, caused by switching the filter coefficients (correction coefficients) of the MTF correction filter along the main scanning direction.
Figure 14B:
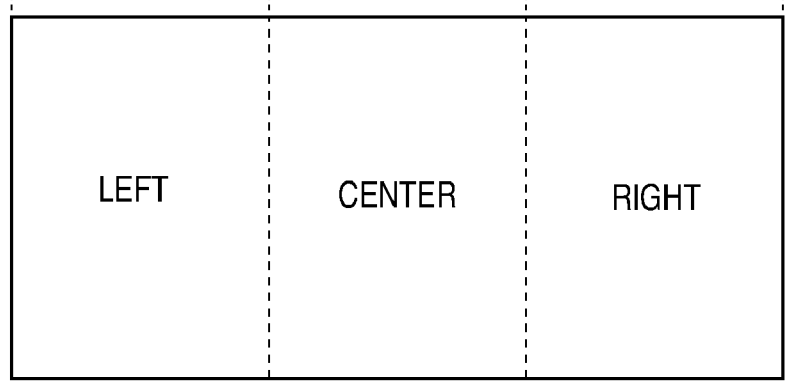

FIGS. 14A and 14B are views showing changes in the MTF correction ratio, caused by switching the filter coefficients (correction coefficients) of the MTF correction filter along the main scanning direction.

The filter coefficients (correction coefficients) calculated by the equation (5) using the linear interpolation are continuously applied to pixels from one switching point to another, whereby it is possible to eliminate moire and image streaks caused by a sudden change in the MTF characteristics.

FIG. 15 is a table of MTF characteristic values on the front and back surfaces of the original, obtained by correcting the MTF characteristics of the FIG. 9 MTF characteristic values using the filter coefficients calculated by the FIG. 11 process.

It is understood from FIG. 15 that the MTF characteristic values in each area on the front surface in the main scanning direction and the sub scanning direction, and the MTF characteristic values in each corresponding areas on the back surface in the main scanning direction and the sub scanning direction are corrected such that they are approximated to each other. As described above, MTF correction is performed on at least one of image data output from the first and second image readers such that the MTF characteristics of the first and second image readers are approximated to each other.

Next, a description will be given of a method of reducing the variation in the MTF characteristics in the same plane of the original. The correction of the MTF characteristics is carried out according to the FIG. 11 flowchart In the step S1101, to reduce the variation in the MTF characteristics in the same plane of the original, it is determined the MTF characteristic values in which area (of the left, central, and right areas) should be determined as the reference values (target values) of the MTF characteristic values on the front surface (CCD) in the main and sub scanning directions, and the MTF characteristic values on the back surface (CIS) in the main and sub scanning directions.

Here, the smallest value of the MTF characteristic values of all the areas (the left, central, and right areas) is determined as a reference value.

More specifically, first, out of MTF characteristic values on the front surface (CCD) in the main scanning direction in the areas (the left, central, and right areas), the smallest value is selected. Then, the same selecting process is also performed on the MTF characteristic values on the front surface (CCD) in the sub scanning direction. Furthermore, the same selecting processes are also performed on the MTF characteristic values on the back surface (CIS) in the main and sub scanning directions.

For example, in the case of the MTF characteristic values shown in FIG. 15, the MTF characteristic values on the front surface (CCD) in the main scanning direction are 67%, 58%, and 62% in the order of the left area, the central area, and the right area, and hence the value 58% in the central area is selected as the smallest MTF characteristic value. The MTF characteristic values on the back surface (CIS) in the sub scanning direction are 59%, 54%, and 59% in the order of the left area, the central area, and the right area, and hence the value 54% in the central area is selected as the smallest MTF characteristic value.

Although in the above example, the smallest value of the MTF characteristic values of all the areas (the left, central, and right areas) in the same plane is selected as a reference value, the largest value of the MTF characteristic values of all the areas (the left, central, and right areas) may be selected as a reference value.

Further, an MTF characteristic value of a predetermined area (e.g. the central area) may be selected as a reference value, irrespective of the magnitudes of the MTF characteristic value.

In the step S1102, MTF correction ratios in the respective areas are calculated based on the reference values (target values) selected in the step S1101 by the equation (4).

It should be noted that here, the reference MTF characteristic value is intended to mean the MTF characteristic value of the area selected in the step S1101 (any of the left, central, and right areas), and MTF characteristic value in an target area is intended to mean an MTF characteristic value in an area corresponding to the reference MTF characteristic value (in an area of the left, central, and right areas, which is not selected in the step S1101.

FIG. 16 is a table of MTF correction ratios calculated based on the FIG. 9 MTF characteristic values, by the equation (4) in each of the areas (left, central, and right areas)

In a step S1103, the filter coefficients (correction coefficients) of the MTF correction filters, for realizing the MTF correction ratios calculated in the step S1102, are calculated.

In a step S1104, linear interpolation calculation of the filter coefficients of the MTF correction filters is carried out between the respective areas by the equation (5).

FIG. 17 is a table of MTF characteristic values obtained by correcting the MTF characteristics of the FIG. 15 MTF characteristic values obtained by correction between the front and back surfaces of the original, using the filter coefficients calculated by the FIG. 11 process.

It is understood from FIG. 17 that the MTF characteristic values in the same plane are corrected such that they are approximated to each other. As described above, MTF correction is performed on image data of at least one area, output from the first or second image reader unit, such that the MTF characteristics in the respective areas (left, central, and right areas) of the first or second image reader unit are approximated to each other.

As described above, by reducing the differences in the MTF characteristics between the front and back surfaces of the original, and the variation in the MTF characteristics in the same plane of the original, it is possible to reduce a pattern of occurrence of moire and the differences in color between the front and back surfaces of the original, and further to make inconspicuous the variation in density (color) in the same plane.

Although the description has been given so far of the method of reducing the differences in the MTF characteristics between the front and back surfaces of the original, and the method of reducing the variation in the MTF characteristics in the same plane, in the mentioned order, hereinafter, a description will be given of a method of performing the two methods simultaneously.

FIG. 11 is the flowchart showing the process for calculating the filter coefficients of the MTF correction filters.

In the step 1101, to simultaneously perform matching of the MTF characteristics on the front and back surfaces of the original, and matching of the MTF characteristics in the same plane of the original, MTF characteristic values which should serve as reference values are selected from the MTF characteristic values in the areas (left, central, and right areas) on the front and back surfaces of the original in the main and sub scanning directions.

More specifically, the smallest MTF characteristic value is selected as a reference MTF characteristic value from the MTF characteristic values in all the areas (left, central, and right areas) on the front surface (CCD) and the back surface (CIS) of the original in the main scanning direction. Further, in the same manner, the smallest MTF characteristic value is selected as a reference MTF characteristic value in the sub scanning direction.

For example, in the case of the FIG. 9 MTF characteristic values in the main scanning direction, the MTF characteristic values on the front surface (CCD) are 67%, 61%, and 62% in the order of the left area, the central area, and the right area, and the MTF characteristic values on the back surface (CIS) are 78%, 60%, and 72% in the order of the left area, the central area, and the right area. Accordingly, the MTF characteristic value of 60% in the central area on the back surface (CIS) side, which is the smallest MTF characteristic value, is selected. Similarly, in the case of the FIG. 9 MTF characteristic values in the sub scanning direction, the MTF characteristic values on the front surface (CCD) are 58%, 53%, and 60% in the order of the left area, the central area, and the right area, and the MTF characteristic values on the back surface (CIS) are 69%, 72%, and 74% in the same order. Accordingly, the MTF characteristic value of 53% in the central area on the front surface (CCD) side, which is the smallest MTF characteristic value, is selected.

It should be noted that although in the above example, the smallest vale is selected from all the MTF characteristic values on the front and back surfaces in each scanning direction, a desired value may be designated as the reference MTF characteristic value. Further, an average value of the MTF characteristic values in the main scanning direction may be selected.

In the step S1102, MTF correction ratios for use in the respective areas are calculated based on the reference values (target values) selected in the step S1101 by the equation (4).

FIG. 18 is a table of MTF correction ratios for use in the respective areas, calculated based on the FIG. 9 MTF characteristic values by the equation (4).

In the step S1103, the filter coefficients (correction coefficients) of the MTF correction filters, for realizing the MTF correction ratios calculated in the step S1102, are calculated.

In the step S1104, linear interpolation calculation of the filter coefficients of the MTF correction filters is carried out between the respective areas by the equation (5).

FIG. 19 is a table of corrected MTF characteristic values obtained by correcting the MTF characteristics of the FIG. 9 MTF characteristic values, using the filter coefficients calculated by the FIG. 11 process.

By the above method as well, it is possible to obtain the same advantageous effects as provided by the above-described process for reducing the differences in the MTF characteristics on the front and back surfaces, and the process for reducing the variation in the MTF characteristics in the same plane.

Although in the above-described embodiment, the MTF characteristic evaluation chart is divided into three parts in the main scanning direction, this is not limitative, but to match the MTF characteristics with each other more precisely, it is only required to divide the MTF characteristic evaluation chart into a larger number of parts, such as five parts, seven parts, and so forth, in the main scanning direction.

Figure 20:
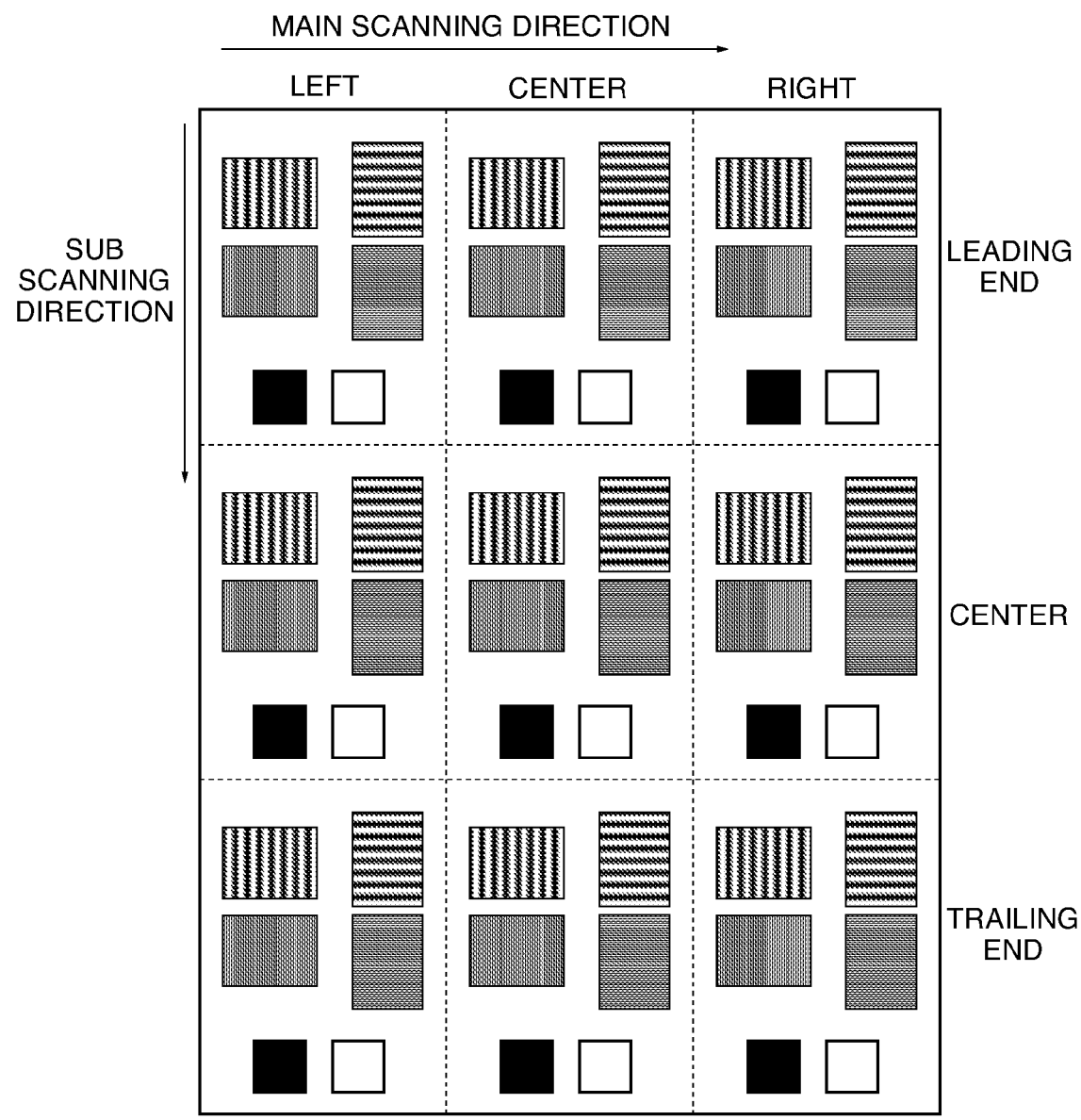
FIG. 20 is a view showing an MTF characteristic evaluation chart obtained by dividing the image area into three parts along the main scanning direction and the sub scanning direction.

Further, division of the MTF characteristic evaluation chart along the sub scanning direction may be performed similarly to the division thereof along the main scanning direction. For example, FIG. 20 is a view showing an MTF characteristic evaluation chart obtained by dividing the image area into three parts along each of the main scanning direction and the sub scanning direction.

Furthermore, to read image data of a color original, the color original may be divided into three color originals, i.e. red, green, and blue originals such that the MTF characteristics of the respective color originals are corrected.

To read the front and back surfaces of an original, if two CCD line sensors are used without using the CIS, there still exist variations not only in the characteristics of the individual sensors but also in the characteristics of the respective component elements (lamps, mirrors and lenses) of a reading optical system, and further, there is a limit to adjustment, such as six-axis adjustment in the manufacturing process of the component elements. Therefore, similarly to the case of the CCD line sensor and the CIS being used to read the front and back surfaces of the original, differences in the MTF characteristics are caused in the same plane of the original or between the front and back surfaces of the original, and hence the above-described correction of the MTF characteristics is effective in such a case as well.

Next, a second embodiment of the present invention will be described.

The arrangement of the second embodiment is basically the same as that of the first embodiment. Therefore, duplicate description of components corresponding to those in the first embodiment is omitted by designating them using the same reference numerals, and only different points from the first embodiment will be described.

The second embodiment is configured to reduce load generated in the information processing device when correction of the MTF characteristics in the first embodiment is performed in real time.

In general, when the MTF correction ratios are approximated to each other, the filter coefficients of the MTF correction filters associated with each other are also approximated to each other. In this case, even when linear interpolation is performed on the filter coefficients approximated to each other, only substantially the same filter coefficients can be obtained, and it is useless to perform the linear interpolation.

To eliminate the inconvenience, when the MTF correction ratios are approximated to each other, if there exists a high degree of approximation between the MTF correction ratios, linear interpolation is inhibited from being performed, whereby it is possible to dispense with useless execution of the linear interpolation, thereby making it possible to reduce load on the processing device.

Now, the difference between the MTF correction ratios is used as a degree of approximation between the MTF correction ratios, and the differences between the MTF correction ratios are classified into three ranges of 0% to 3%, 3% to 5%, and 5% or more.

Figure 21:
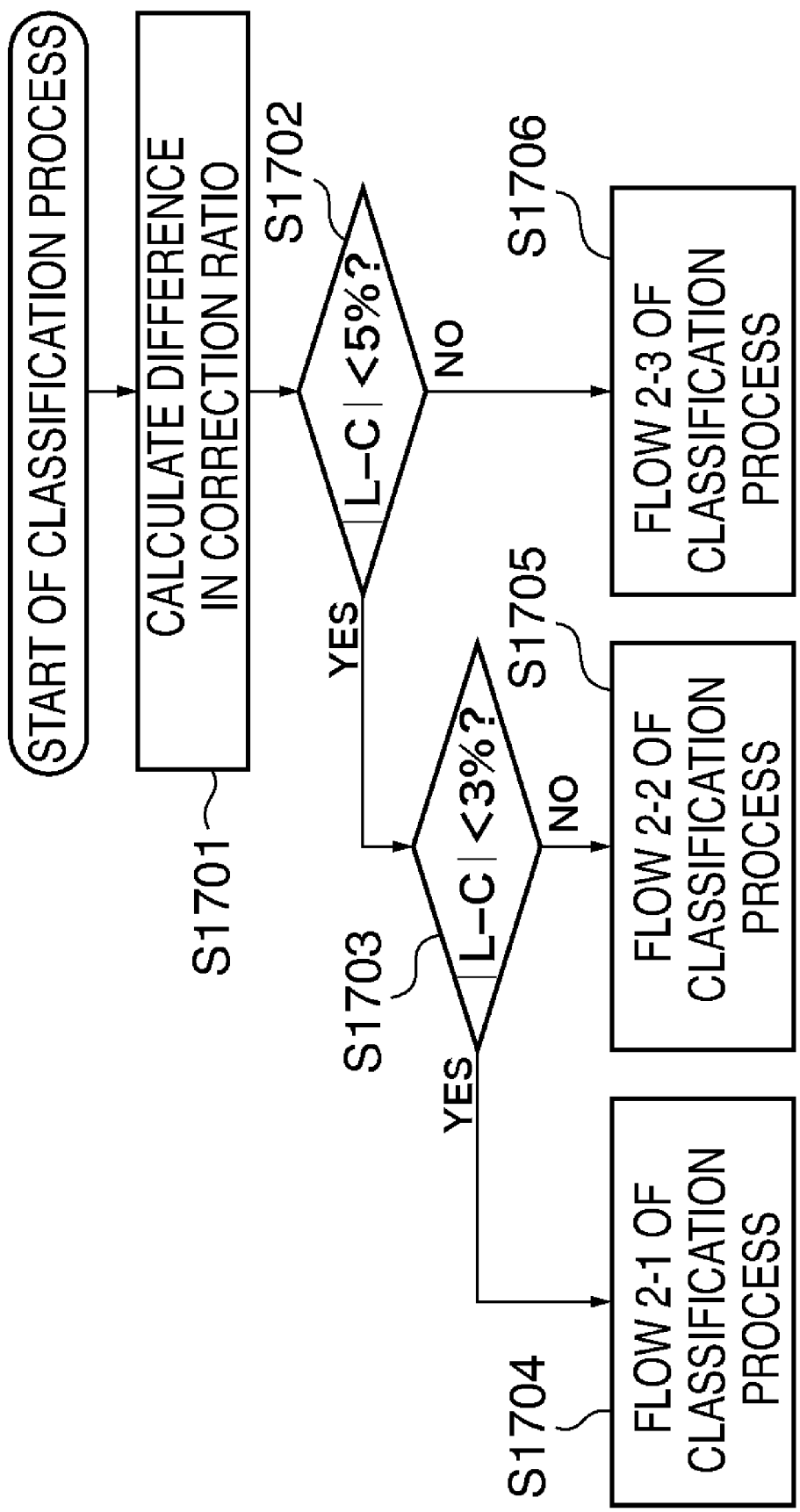
FIG. 21 is a flowchart showing a classification process for classifying the differences between the respective MTF correction ratios in the left area, the central area, and the right area into any of three ranges of 0% to 3%, 3% to 5%, and 5% or more.
Figure 22:
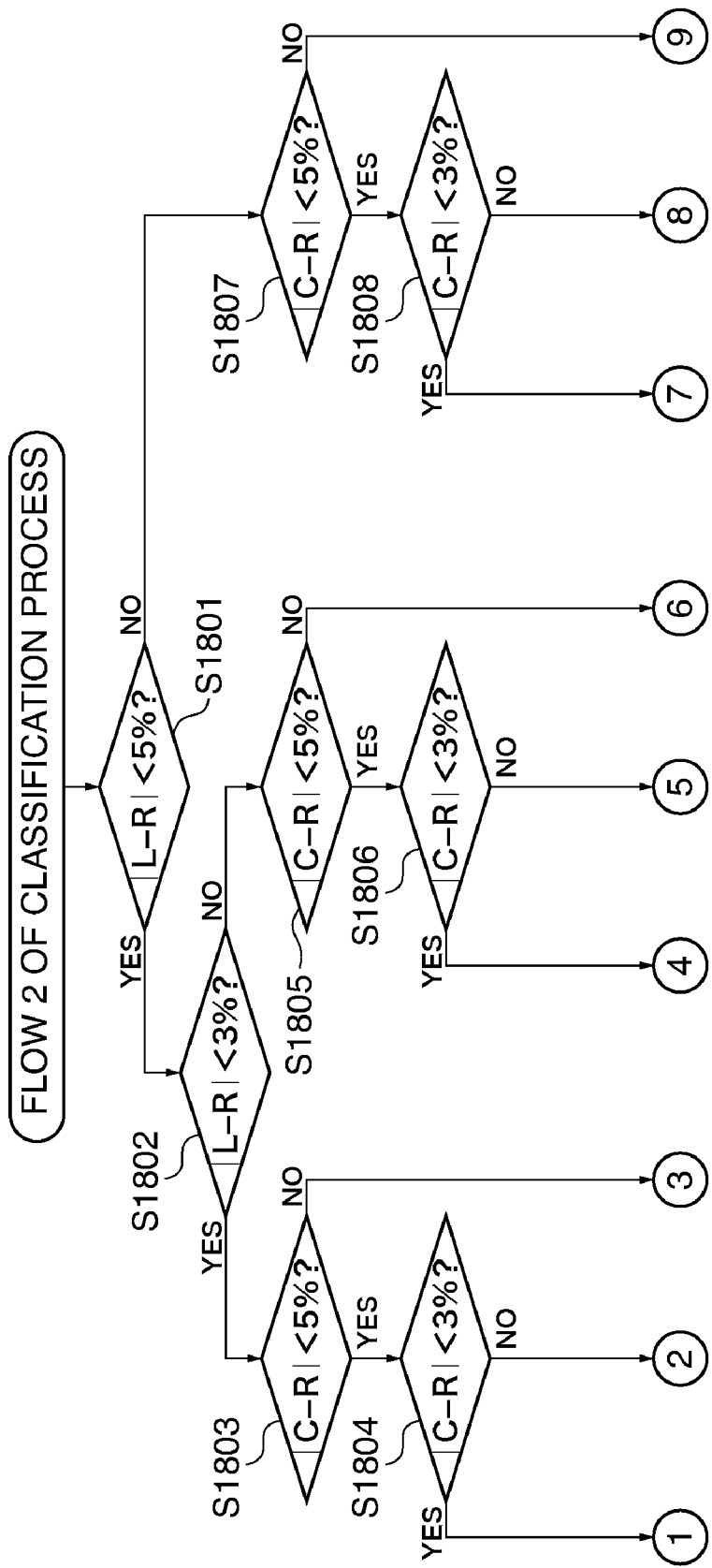
FIG. 22 is a flowchart showing a classification process continued from the FIG. 21 classification process.
Figure 23:
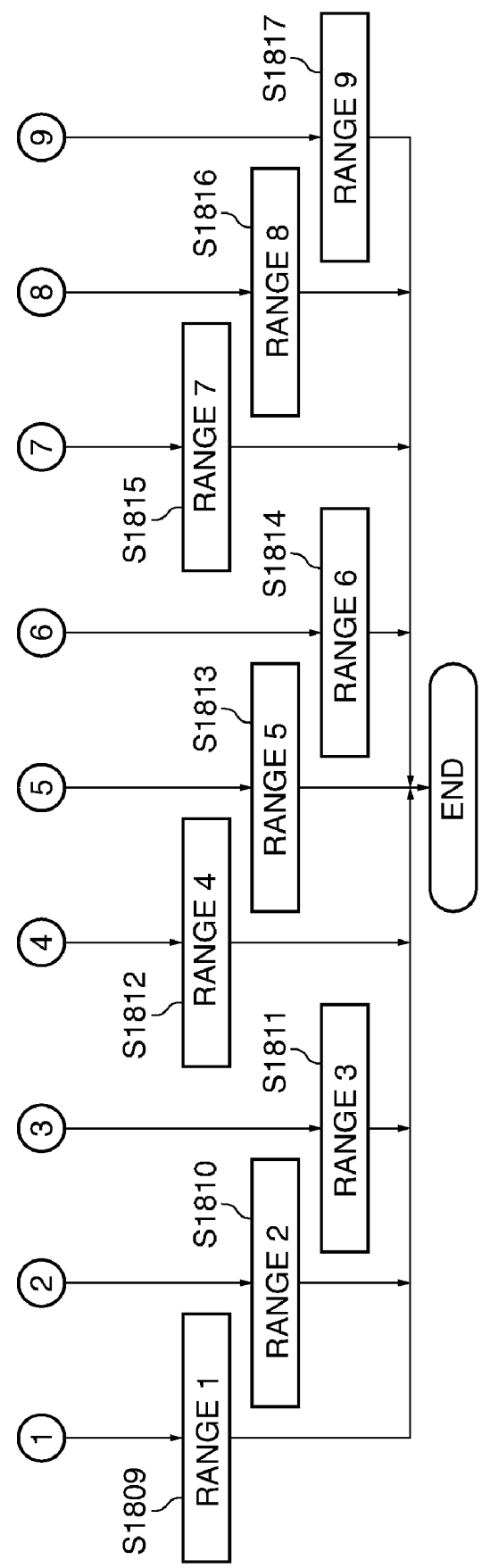
FIG. 23 is a flowchart showing a classification process continued from the FIG. 22 classification process.

FIGS. 21 to 23 are flowcharts showing a classification process for classifying the differences between the MTF correction ratios in the left area, the central area, and the right area shown in FIG. 8, into any of the three ranges of 0% to 3%, 3% to 5%, and 5% or more.

In FIGS. 21 and 22, L designates the MTF correction ratio in the left area in FIG. 8. Similarly, C designates the MTF correction ratio in the central area, and R designates the MTF correction ratio in the right area.

Referring to FIG. 21, first, in a step S1701, the differences |L−C|, |L−R|, and |C−R| between the respective MTF correction ratios in the left area, the central area, and the right area in FIG. 8 are calculated.

Then, in steps S1702 and S1703, it is determined in which of the three ranges of 0% to 3%, 3% to 5%, and 5% or more the difference |L−C| between the MTF correction ratios is. As the result of the determination, if the difference |L−C| is in the range of 0% to 3%, the process proceeds to a step S1704, whereas if the difference |L−C| is in the range of 3% to 5%, the process proceeds to a step S1705. Further, if the difference |L−C| is in the range of 5% or more, the process proceeds to a step S1706.

In the step S1704, a flow 2-1 of the classification process is executed, whereas in the step S1705, a flow 2-2 of the classification process is executed. Further, in the step S1706, a flow 2-3 of the classification process is executed.

In any of the flows 2-1, 2-2, and 2-3, a flow 2 of the classification process shown in FIGS. 18 and 19 is carried out.

Referring to FIG. 22, in steps S1801 and S1802, it is determined in which of the three ranges of 0% to 3%, 3% to 5%, and 5% or more the difference |L−R| between the MTF correction ratios is. As the result of the determination, if the difference |L−R| is in the range of 0% to 3%, the process proceeds to a step S1803, whereas if the difference |L−R| is in the range of 3% to 5%, the process proceeds to a step S1805. Further, if the difference |L−R| is in the range of 5% or more, the process proceeds to a step S1807.

Then, in the step S1803 and a step S1804, it is determined in which of the three ranges of 0% to 3%, 3% to 5%, and 5% or more the difference |C−R| between the MTF correction ratios is. As the result of the determination, if the difference |C−R| is in the range of 0% to 3%, the process proceeds to a step S1809, whereas if the difference |C−R| is in the range of 3% to 5%, the process proceeds to a step S1810. Further, if the difference |C−R| is in the range of 5% or more, the process proceeds to a step S1811.

Also in the step S1805 and a step S1806, it is determined in which of the three ranges of 0% to 3%, 3% to 5%, and 5% or more the difference |C−R| between the MTF correction ratios is. As the result of the determination, if the difference |C−R| is in the range of 0% to 3%, the process proceeds to a step S1812, whereas if the difference |C−R| is in the range of 3% to 5%, the process proceeds to a step S1813. Further, if the difference |C−R| is in the range of 5% or more, the process proceeds to a step S1814.

Also in the step S1807 and a step S1808, it is determined in which of the three ranges of 0% to 3%, 3% to 5%, and 5% or more the difference |C−R| between the MTF correction ratios is. As the result of the determination, if the difference |C−R| is in the range of 0% to 3%, the process proceeds to a step S1815, whereas if the difference |C−R| is in the range of 3% to 5%, the process proceeds to a step S1816. Further, if the difference |C−R| is in the range of 5% or more, the process proceeds to a step S1817.

In the steps S1809 to S1817, a combination of the differences |L−R| and |C−R| between the MTF correction ratios are classified into ranges 1 to 9, respectively, followed by terminating the present process.

FIGS. 24A to 24E are views showing the relationships between the MTF correction ratios in the left area, the central area and the right area, and the MTF correction ratios in respective associated adjacent areas in FIG. 8.

Figure 24A:
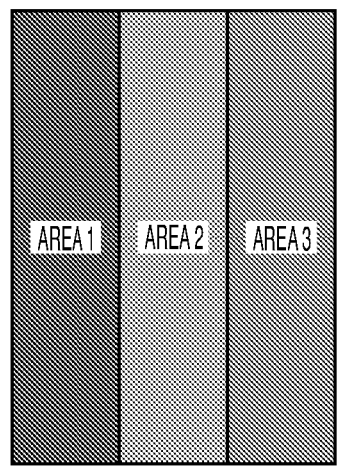
FIGS. 24A to 24E are views showing the relationships between the MTF correction ratios in the left area, the central area, and the right area in FIG. 8, and MTF correction ratios in adjacent areas thereof.

FIG. 24A shows a relationship in which the respective MTF correction ratios in the three areas are different from each other, and it is impossible to use MTF correction filters having the same MTF correction ratio. In this relationship, the linear interpolation of the filter coefficients of the MTF correction filters is performed between the respective areas. This results in large load on the processing device.

Figure 24B:
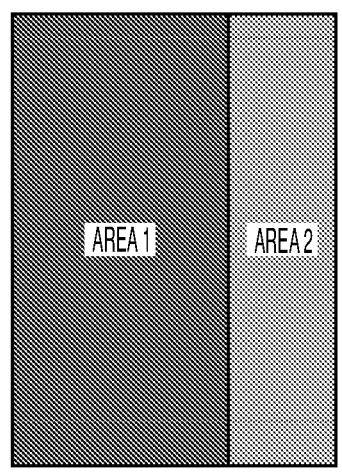
Figure 24C:
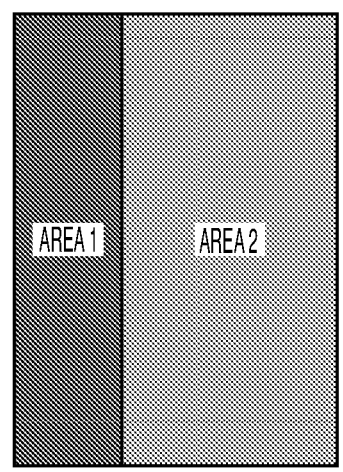

FIGS. 24B and 24C show a relationship in which the MTF correction ratios in two of the three areas have approximately the same value, and it is possible to use MTF correction filters having the same MTF correction ratio. In this relationship, the linear interpolation of the filter coefficients of the MTF correction filters is performed only between an area 1 and an area 2. As a result, load on the processing device can be reduced compared with the case of the relationship shown in FIG. 24A being held.

Figure 24D:
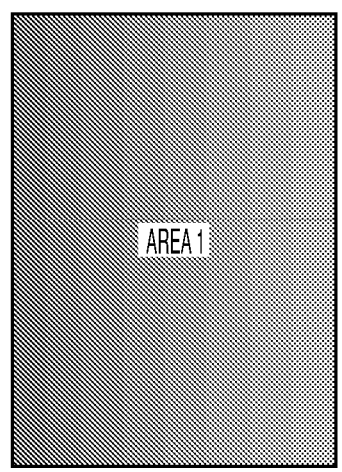

FIG. 24D shows a relationship in which the MTF correction ratio is linearly changed over the three areas from 90% to 80% and 70% from left to right. In this relationship, although it is only required to specify the maximum value and the minimum value alone as the filter coefficients of the MTF correction filters, the load on the processing device becomes maximum, since it is necessary to perform the linear interpolation of the filter coefficients over the whole area.

Figure 24E:
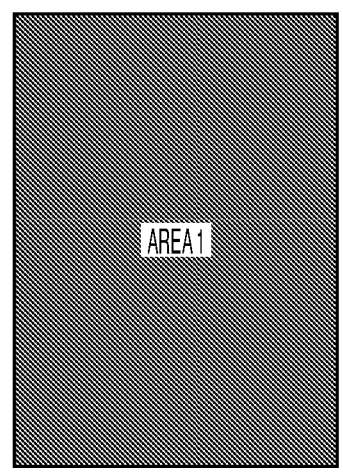

FIG. 24E shows a relationship in which the MTF correction ratios have approximately the same value in the three areas, and it is possible to use MTF correction filters having the same MTF correction ratio. In this relationship, it is not necessary to perform the linear interpolation of the filter coefficients of the MTF correction filters, which makes it possible to minimize the load on the processing device.

FIGS. 25A to 25C are tables showing correspondence between the ranges 1 to 9 determined by the classification process shown in FIGS. 21 to 23, and the inter-area relationship between the MTF correction ratios shown in FIGS. 24A to 24E.

More specifically, when the flow 2 of the classification process shown in FIG. 22 is executed after the process has proceeded to the step S1704 in FIG. 21 (with the difference |L−C| between the MTF correction ratios being in the range of 0% to 3%), FIG. 25A is applied. Further, when the flow 2 of the classification process shown in FIG. 22 is executed after the process has proceeded to the step S1705 in FIG. 21 (with the difference |L−C| between the MTF correction ratios being in the range of 3% to 5%), FIG. 25B is applied. Further, when the flow 2 of the classification process shown in FIG. 22 is executed after the process has proceeded to the step S1706 in FIG. 21 (with the difference |L−C| between the MTF correction ratios being in the range of 5% or more), FIG. 25C is applied.

In FIGS. 25A to 25C, as the result of execution of the flow 2 of the classification process in FIG. 22, one of the inter-area relationship between the MTF correction ratios shown in FIGS. 24A to 24E is determined according to the classified range. It is determined whether or not the linear interpolation of the filter coefficients of the MTF correction filters is to be executed, based on the determined inter-area relationship between the MTF correction ratios.

It should be noted that in FIGS. 25A to 25C the symbol "-" appearing in boxes of "Inter-area relationship" represents that the inter-area relationship is not determined to be any of the inter-area relationships between the MTF correction ratios shown in FIGS. 24A to 24E.

Figure 26:
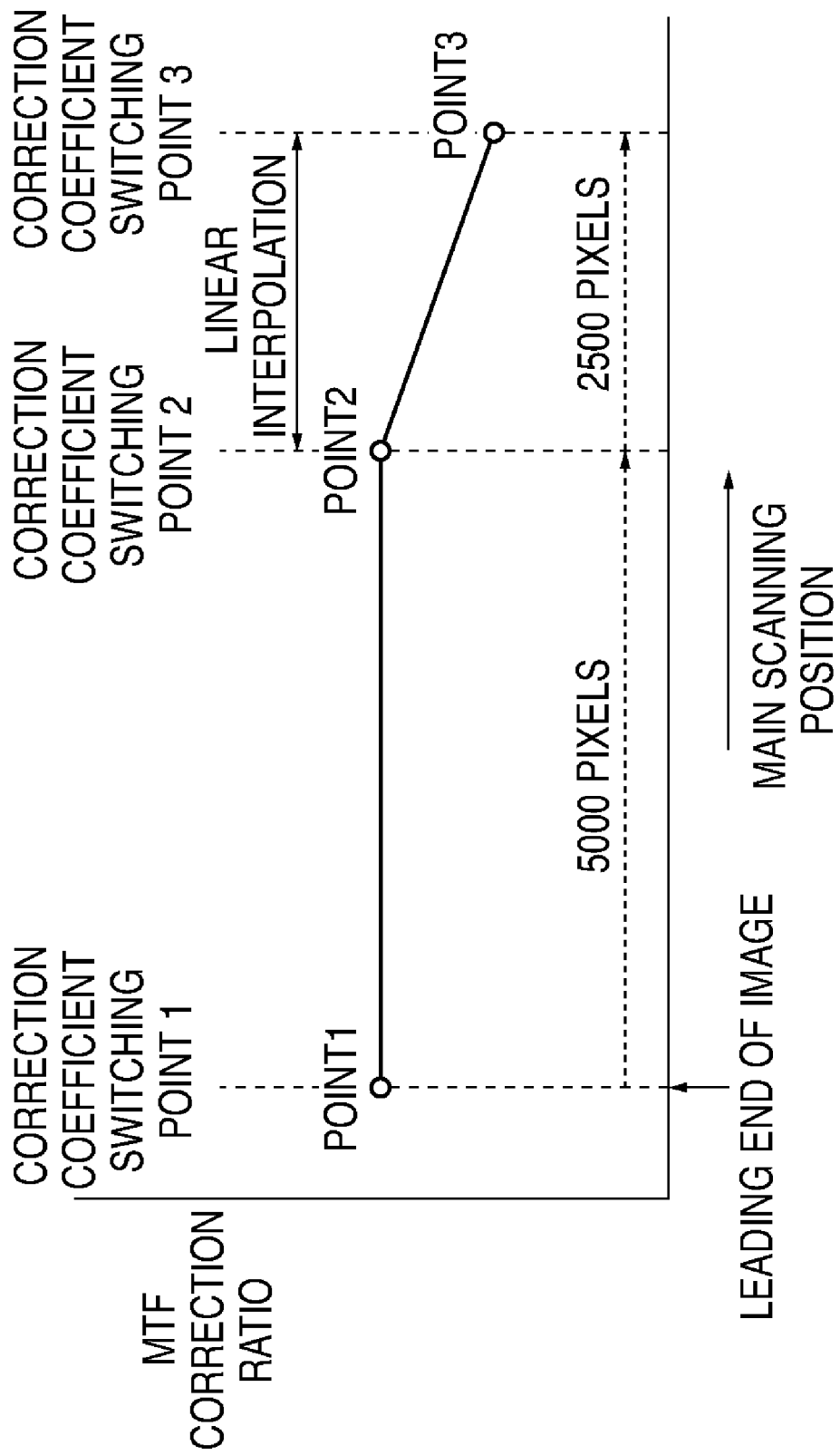
FIG. 26 is a view showing changes in the MTF correction ratio caused by switching the filter coefficients (correction coefficients) of the MTF correction filter along the main scanning direction, in the FIG. 24B inter-area relationship.

FIG. 26 is a view showing changes in the MTF correction ratio caused by switching the filter coefficients (correction coefficients) of the MTF correction filter along the main scanning direction, in the FIG. 24B inter-area relationship.

Figure 27:
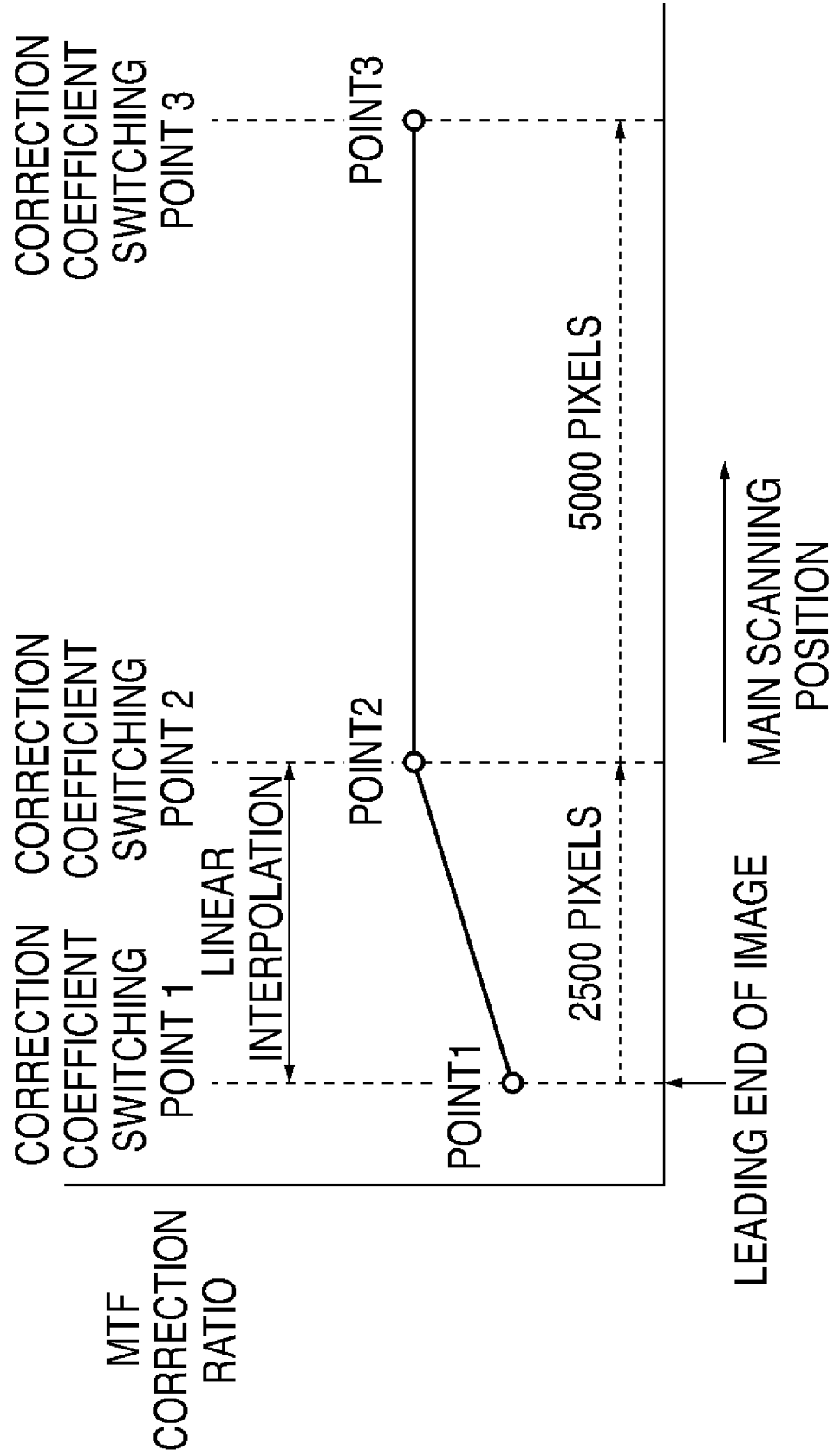
FIG. 27 is a view showing changes in the MTF correction ratio caused by switching the filter coefficients (correction coefficients) of the MTF correction filter along the main scanning direction, in the FIG. 24C inter-area relationship.

FIG. 27 is a view showing changes in the MTF correction ratio caused by switching the filter coefficients (correction coefficients) of the MTF correction filter along the main scanning direction, in the FIG. 24C inter-area relationship.

Figure 28:
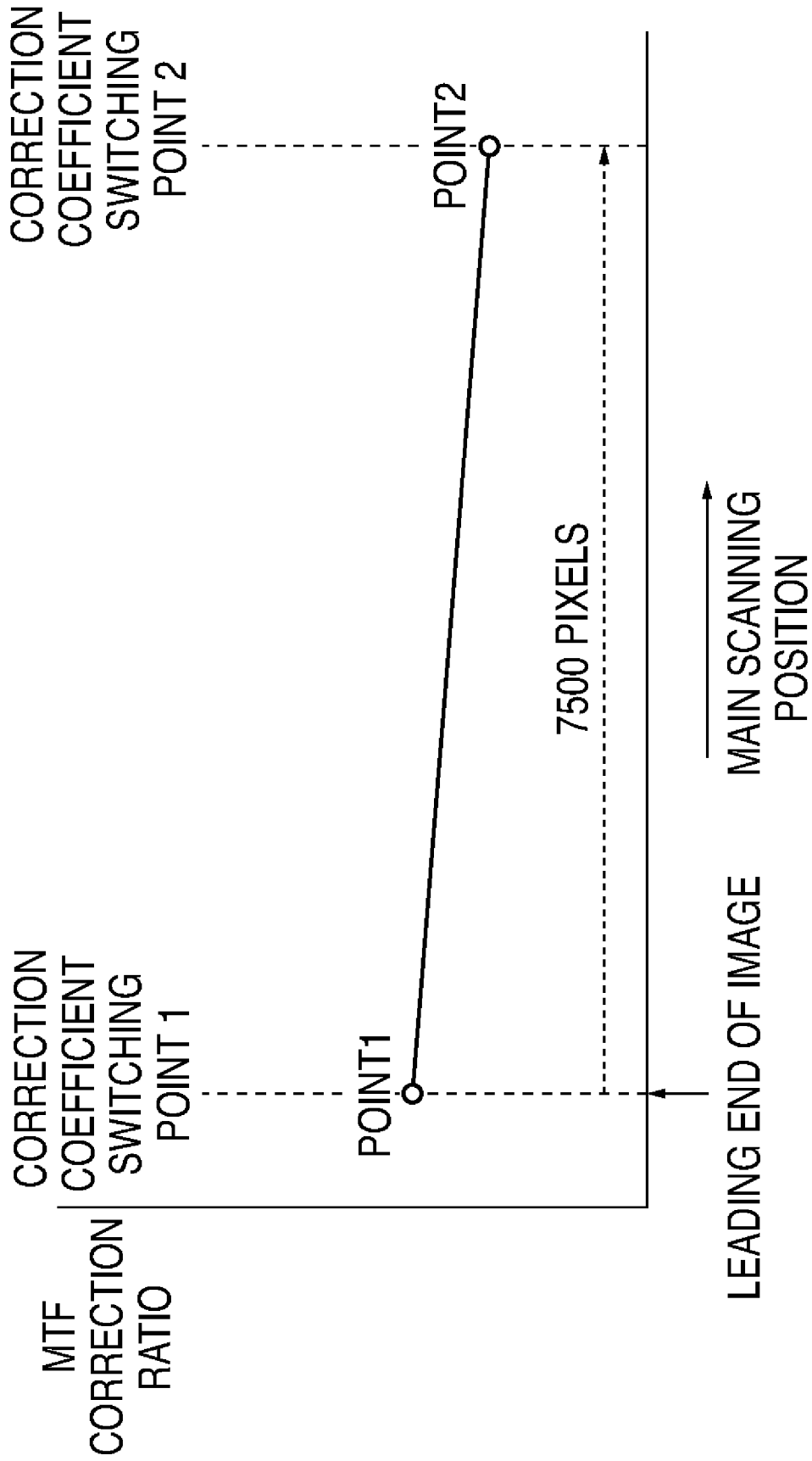
FIG. 28 is a view showing changes in the MTF correction ratio caused by switching the filter coefficients (correction coefficients) of the MTF correction filter along the main scanning direction, in the FIG. 24D inter-area relationship.

FIG. 28 is a view showing changes in the MTF correction ratio caused by switching the filter coefficients (correction coefficients) of the MTF correction filter along the main scanning direction, in the FIG. 24D inter-area relationship.

Figure 29:
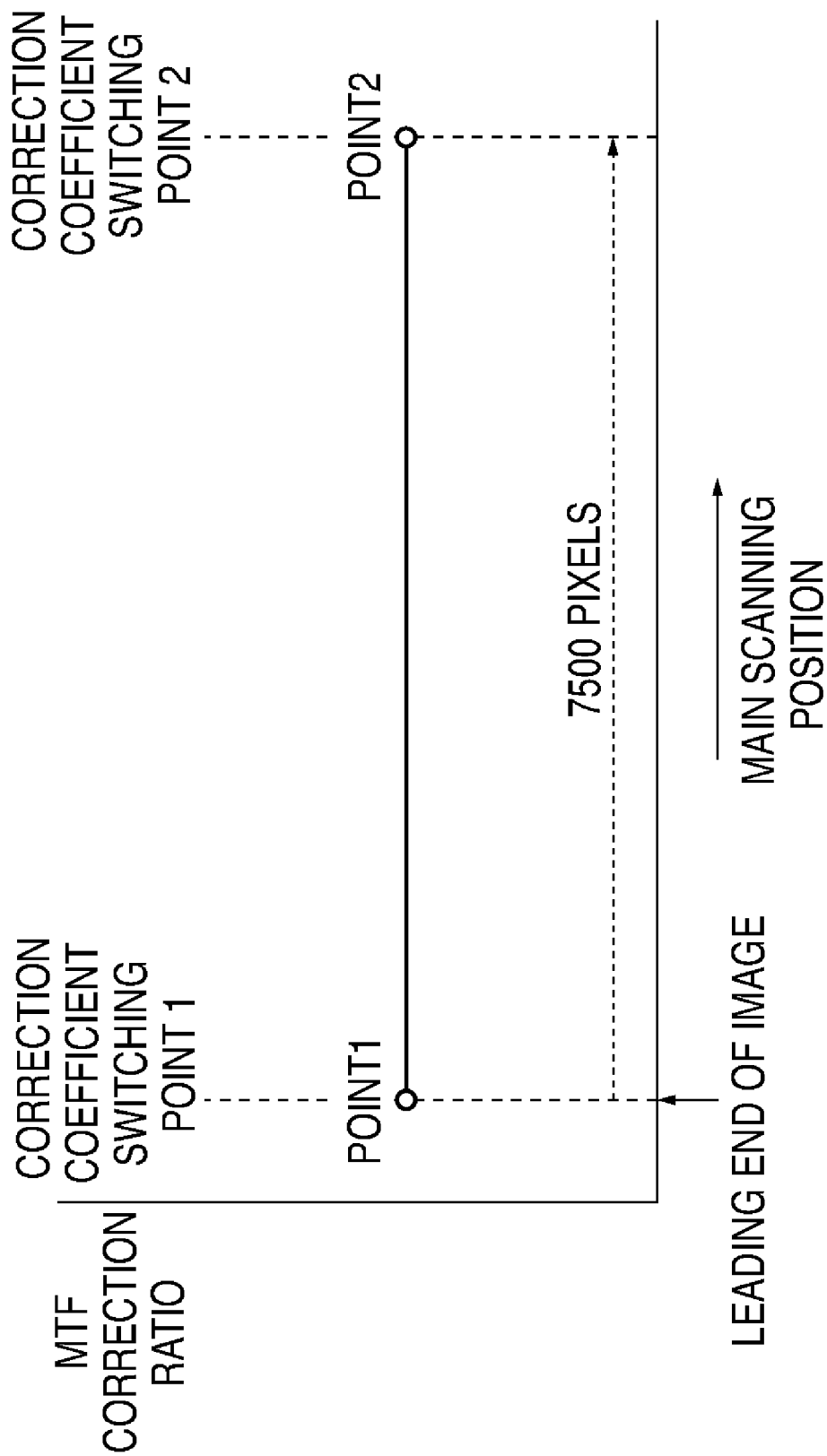
FIG. 29 is a view showing changes in the MTF correction ratio caused by switching the filter coefficients (correction coefficients) of the MTF correction filter along the main scanning direction, in the FIG. 24E inter-area relationship.

FIG. 29 is a view showing changes in the MTF correction ratio caused by switching the filter coefficients (correction coefficients) of the MTF correction filter along the main scanning direction, in the FIG. 24E inter-area relationship.

As described above, in the second embodiment, it is determined whether or not the linear interpolation of the filter coefficients of the MTF correction filters is to be executed, based on the inter-area relationship between the MTF correction ratios. This automatically reduces the load on the processing device.

Further, although in the second embodiment, the MTF characteristic evaluation chart is divided into three parts along the main scanning direction, by way of example, this is not limitative, but the MTF characteristic evaluation chart may be divided along the sub scanning direction.

It is to be understood that the present invention may also be realized by supplying a system or an apparatus with a storage medium in which a program code of software, which realizes the functions of either of the above described embodiments is stored, and causing a computer (or CPU or MPU) of the system or apparatus to read out and execute the program code stored in the storage medium.

In this case, the program code itself read from the storage medium realizes the functions of either of the above described embodiments, and therefore the program code and the storage medium in which the program code is stored constitute the present invention.

Examples of the storage medium for supplying the program code include a floppy (registered trademark) disk, a hard disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program may be downloaded via a network.

Further, it is to be understood that the functions of either of the above described embodiments may be accomplished not only by executing the program code read out by a computer, but also by causing an OS (operating system) or the like which operates on the computer to perform a part or all of the actual operations based on instructions of the program code.

Further, it is to be understood that the functions of either of the above described embodiments may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2006-277799 filed Oct. 11, 2006, which is hereby incorporated by reference herein in its entirety.

What is claimed is:

1. An image reading apparatus comprising:
a first reading unit configured to read a first surface of a sheet, and output image data of the read first surface;
a second reading unit configured to read a second surface of the sheet, and output image data of the read second surface;
an MTF correction filter coefficient determination unit configured to detect, on the basis of output image data of a chart sheet from said first and second reading units, an MTF value for each of a plurality of areas to which reading areas of said first and second reading units are respectively divided, determine a reference MTF value based on the MTF value for each of the plurality of areas of said first and second reading units, and determine an MTF correction filter coefficient for each of the plurality of areas of said first and second reading units based on (a) the MTF value of the corresponding area of the plurality of areas of said first and second reading units and (b) the reference MTF value; and
an MTF correction unit configured to perform MTF correction on output image data of a sheet of an original from said first and second reading units, based on the MTF correction filter coefficient for each of the plurality of areas of said first and second reading units.

2. An image reading apparatus as claimed in claim 1, wherein said first and second reading units have reading methods different from each other.

3. An image reading apparatus as claimed in claim 2, wherein one of said first and second reading units is of a reducing optical system, and the other thereof is of a unity magnification optical system.

4. An image reading apparatus as claimed in claim 3, wherein said reading unit of the reducing optical system is a CCD line sensor, and said reading unit of the unity magnification optical system is a CIS.

5. An image reading apparatus as claimed in claim 1, wherein said MTF correction unit corrects MTF characteristics in a main scanning direction and MTF characteristics in a sub scanning direction.

6. An image reading apparatus as claimed in claim 1, wherein said MTF correction unit corrects MTF characteristics of each of a plurality of areas divided along a main scanning direction.

7. An image reading apparatus as claimed in claim 1, wherein the reference MTF value is a maximum MTF value of the MTF values of the plurality of areas.

8. An image reading apparatus as claimed in claim 1, wherein the reference MTF value is a minimum MTF value of the MTF values of the plurality of areas.

9. An image reading apparatus as claimed in claim 1, wherein said MTF correction unit corrects MTF characteristics in a main scanning direction or MTF characteristics in a sub scanning direction.

10. An image reading apparatus as claimed in claim 1, wherein said MTF correction unit corrects MTF characteristics of each of a plurality of areas divided along each of a main scanning direction and a sub scanning direction.

11. An image reading apparatus as claimed in claim 1, further comprising an interpolating unit configured to interpolate the MTF correction filter coefficient for each of the plurality of areas of said first and second reading units and calculate a filter coefficient applied to each of pixels.

12. A method for adjusting an image reading apparatus, said image reading apparatus including:
a first reading unit configured to read a first surface of a sheet and output image data of the read first surface;
a second reading unit configured to read a second surface of the sheet and output image data of the read second surface;
an MTF correction filter coefficient determination unit; and
an MTF correction unit,
said method comprising the steps of:
having said MTF correction filter coefficient determination unit detect, on the basis of output image data of a chart sheet from said first and second reading units, an MTF value for each of a plurality of areas to which reading areas of said first and second reading units are respectively divided, determine a reference MTF value based on the MTF value for each of the plurality of areas of said first and second reading units, and determine an MTF correction filter coefficient for each of the plurality of areas of said first and second reading units based on (a) the MTF value of the corresponding area of the plurality of areas of said first and second reading units and (b) the reference MTF value; and
having said MTF correction unit perform MTF correction on output image data of a sheet of an original from said first and second reading units, based on the MTF correction filter coefficient for each of the plurality of areas of said first and second reading units.

13. A method as claimed in claim 12, wherein the reference MTF value is a maximum MTF value of the MTF values of the plurality of areas.

14. A method as claimed in claim 12, wherein the reference MTF value is a minimum MTF value of the MTF values of the plurality of areas.

15. A method as claimed in claim 12, wherein said MTF correction corrects MTF characteristics in a main scanning direction and MTF characteristics in a sub scanning direction.

16. A method as claimed in claim 12, wherein said MTF correction corrects MTF characteristics in a main scanning direction or MTF characteristics in a sub scanning direction.

17. A method for determining a MTF correction filter coefficient used for an image reading apparatus, said image reading apparatus including:

a first reading unit configured to read a first surface of a sheet and output image data of the read first surface;

a second reading unit configured to read a second surface of the sheet, and output image data of the read second surface; and an MTF correction unit configured to perform MTF correction on output image data of a sheet of an original from said first and second reading units;

said method comprising the steps of:

detecting, on the basis of output image data of a chart sheet from said first and second reading units, an MTF value for each of a plurality of areas to which reading areas of said first and second reading units are respectively divided;

determining a reference MTF value based on the MTF value for each of the plurality of areas of said first and second reading units; and determining an MTF correction filter coefficient for each of the plurality of areas of said first and second reading units based on (a) the MTF value of the corresponding area of the plurality of areas of said first and second reading units and (b) the reference MTF value.

* * * * *